(12) United States Patent
Milton et al.

(10) Patent No.: US 7,555,741 B1
(45) Date of Patent: Jun. 30, 2009

(54) COMPUTER-AIDED-DESIGN TOOLS FOR REDUCING POWER CONSUMPTION IN PROGRAMMABLE LOGIC DEVICES

(75) Inventors: David Ian M. Milton, Whitby (CA); David Neto, Toronto (CA); Vaughn Betz, Toronto (CA)

(73) Assignee: Altera Corporation, San Jose, CA (US)

( * ) Notice: Subject to any disclaimer, the term of this patent is extended or adjusted under 35 U.S.C. 154(b) by 351 days.

(21) Appl. No.: 11/520,944

(22) Filed: Sep. 13, 2006

(51) Int. Cl.
*G06F 17/50* (2006.01)
(52) U.S. Cl. .................. 716/16; 716/4; 716/18
(58) Field of Classification Search .............. 716/4, 716/16, 18
See application file for complete search history.

(56) References Cited

U.S. PATENT DOCUMENTS

| | | | | |
|---|---|---|---|---|
| 5,677,522 | A * | 10/1997 | Rice et al. ................. | 235/454 |
| 5,748,490 | A * | 5/1998 | Viot et al. .................. | 716/3 |
| 6,038,386 | A * | 3/2000 | Jain .......................... | 716/16 |
| 6,275,969 | B1 * | 8/2001 | Lakshminarayana et al. ... | 716/2 |
| 6,308,313 | B1 * | 10/2001 | Lakshminarayana et al. .. | 716/18 |
| 6,324,679 | B1 * | 11/2001 | Raghunathan et al. ...... | 716/18 |
| 6,345,379 | B1 * | 2/2002 | Khouja et al. .............. | 716/4 |
| 6,397,170 | B1 * | 5/2002 | Dean et al. ................. | 703/14 |
| 6,611,945 | B1 * | 8/2003 | Narasimhan et al. ........ | 716/4 |
| 6,622,287 | B1 * | 9/2003 | Henkel ...................... | 716/2 |
| 6,975,137 | B1 * | 12/2005 | Schadt et al. .............. | 326/39 |
| 7,260,808 | B1 * | 8/2007 | Pasqualini .................. | 716/18 |
| 7,266,797 | B2 * | 9/2007 | Bakir et al. ................ | 716/10 |
| 7,366,997 | B1 * | 4/2008 | Rahmat et al. .............. | 716/1 |
| 7,475,366 | B2 * | 1/2009 | Kuemerle et al. ............ | 716/1 |
| 7,490,302 | B1 * | 2/2009 | Rahman et al. .............. | 716/1 |
| 2005/0039155 | A1 * | 2/2005 | New ........................ | 716/16 |
| 2005/0257178 | A1 * | 11/2005 | Daems et al. .............. | 716/2 |
| 2005/0280438 | A1 * | 12/2005 | Park ......................... | 326/41 |
| 2006/0064669 | A1 * | 3/2006 | Ogilvie et al. .............. | 717/106 |
| 2006/0123376 | A1 * | 6/2006 | Vogel et al. ................ | 716/11 |
| 2006/0225020 | A1 * | 10/2006 | Chandrakasan et al. ...... | 716/17 |
| 2006/0225021 | A1 * | 10/2006 | Padalia et al. .............. | 716/17 |
| 2006/0265681 | A1 * | 11/2006 | Bakir et al. ................ | 716/10 |

(Continued)

OTHER PUBLICATIONS

Cheng et al., "Device and Architecture Co-Optimization for FPGA Power Reduction", 2005 Proceedings of 42nd Design Automation Conference, Jun. 13-17, 2005, pp. 915-920.*

(Continued)

*Primary Examiner*—Phallaka Kik
(74) *Attorney, Agent, or Firm*—Treyz Law Group; G. Victor Treyz

(57) ABSTRACT

Methods and apparatus for designing and producing programmable logic devices are provided. A logic design system may be used to analyze various implementations of a desired logic design for a programmable logic device integrated circuit. The logic design system may be used to produce configuration data for the programmable logic device in accordance with an implementation that minimizes power consumption by the programmable logic device. The programmable logic device contains logic blocks that are used to implement the desired logic design and logic blocks that are unused. Dynamic power consumption can be minimized by identifying which configuration data settings reduce the amount of signal toggling in the unused logic blocks and routing, and by minimizing the capacitance of resources that do toggle. Clock tree power consumption can be reduced by evaluating multiple potential logic design implementations using a strictly concave cost function.

23 Claims, 19 Drawing Sheets

U.S. PATENT DOCUMENTS

2007/0234266 A1* 10/2007 Chen et al. .................... 716/13
2007/0245281 A1* 10/2007 Riepe et al. .................... 716/9
2007/0271545 A1* 11/2007 Eng ............................. 716/18

OTHER PUBLICATIONS

Coudert, "Gate Sizing for Constrained Delay/Power/Area Optimization", IEEE Transaction on Very Large Scale Integration (VLSI) Systems, vol. 5, No. 4, Dec. 1997, pp. 465-472.*

Li et al., "Vdd Programmability to Reduce FPGA Interconnect Power", IEEE/ACM International Conference on Computer-Aided Design, Nov. 7-11, 2004, pp. 760-765.*

Lin et al., "Routing Track Duplication with Fine-Grained Power-Grating for FPGA Interconnect Power Reduction", 2005 Proceedings of Asia and South Pacific Design Automation Conference, vol. 1, Jan. 18-21, 2005, pp. 645-650.*

Julien Lamoureux et al. "On the Interaction Between Power-Aware FPGA CAD Algorithms". IC CAD 2003, pp. 701-708.

Julien Lamoureux et al. "FPGA Clock Network Architecture: Flexibility vs. Area and Power", ACM/SIGDA International Symposium on Field-Programmable Gate Arrays (FPGA), pp. 101-108, 2006.

Neto et al. U.S. Appl. No. 11/414,933, filed May 1, 2006.

Neto et al. U.S. Appl. No. 11/414,803, filed May 1, 2006.

Neto et al. U.S. Appl. No. 11/414,855, filed May 1, 2006.

* cited by examiner

COMPUTER-AIDED-DESIGN TOOLS FOR REDUCING POWER CONSUMPTION IN PROGRAMMABLE LOGIC DEVICES

BACKGROUND

This invention relates to programmable logic devices, and more particularly, to producing logic designs for programmable logic devices that exhibit reduced power consumption.

Programmable logic devices are a type of integrated circuit that can be programmed by a user to implement a desired custom logic function. In a typical scenario, a logic designer uses computer-aided design (CAD) tools to design a custom logic circuit. These tools use information on the hardware capabilities of a given programmable logic device to help the designer implement the custom logic circuit using the resources available on that given programmable logic device. To ensure that the customized programmable logic device performs satisfactorily, the computer-aided design tools optimize the placement and routing of resources on the device.

To satisfy the needs of system designers, programmable logic devices are being developed that contain increasingly large amounts of circuit resources. Although such devices are able to implement complex circuit designs, these devices also tend to consume large amounts of power. Circuits that consume too much power can create thermal management problems and can adversely affect system performance.

One of the largest contributors to power consumption on an integrated circuit is so-called dynamic power. Dynamic power is consumed when a signal toggles between high and low values. Dynamic power consumption scales with the product of load capacitance and signal switching frequency. As a result, dynamic power consumption increases as the capacitive load being driven increases and as the frequency at which a particular logic signal toggles increases.

Conventional computer-aided-design tools for designing customized circuits for programmable logic devices are generally unable to help a system designer reduce dynamic power consumption. System designers are therefore unable to make informed decisions regarding tradeoffs between dynamic power consumption, timing performance, and circuit real estate consumption.

It would therefore be desirable to provide computer-aided-design tools that assist users in designing customized logic circuits for programmable logic devices in which power consumption considerations are taken into account.

SUMMARY

In accordance with the present invention, methods and systems for using computer-aided design tools that reduce dynamic power consumption in programmable logic device integrated circuits are provided.

A user can use the computer-aided design tools to enter a desired logic design. The computer-aided design tools evaluate multiple implementations of the desired logic design in a programmable logic device integrated circuit. In each implementation, some logic blocks are used and some logic blocks are unused. The computer-aided design tools can minimize dynamic power consumption by identifying configuration data settings that reduce the amount of signal toggling in the unused logic blocks.

The programmable logic device integrated circuits use clock trees to distribute clock signals to logic blocks. The computer-aided design tools can use a strictly concave cost function to identify implementations of the desired logic design in which clock tree capacitance and power consumption is minimized.

Further features of the invention, its nature and various advantages will be more apparent from the accompanying drawings and the following detailed description of the preferred embodiments.

DETAILED DESCRIPTION

The present invention relates to programmable logic devices. The invention also relates to systems for designing and programming programmable logic devices so as to minimize undesired dynamic power consumption.

Programmable logic devices are integrated circuits that can be configured by a user to perform custom logic functions. Electrically-programmed programmable logic devices are configured ("programmed") by loading configuration data into the device. The configuration data selectively turns on and off components of the device's circuitry and thereby customizes the logic on the device. Mask-programmed programmable logic devices are similar to electrically-programmed programmable logic devices, but are customized using customized lithographic masks based on the configuration data rather than by electrically loading the configuration data into the device. Mask-programmed programmable logic devices such as the HardCopy© devices available from Altera Corporation of San Jose, Calif. are sometimes referred to as structured ASICs (application-specific integrated circuits).

Figure 1:
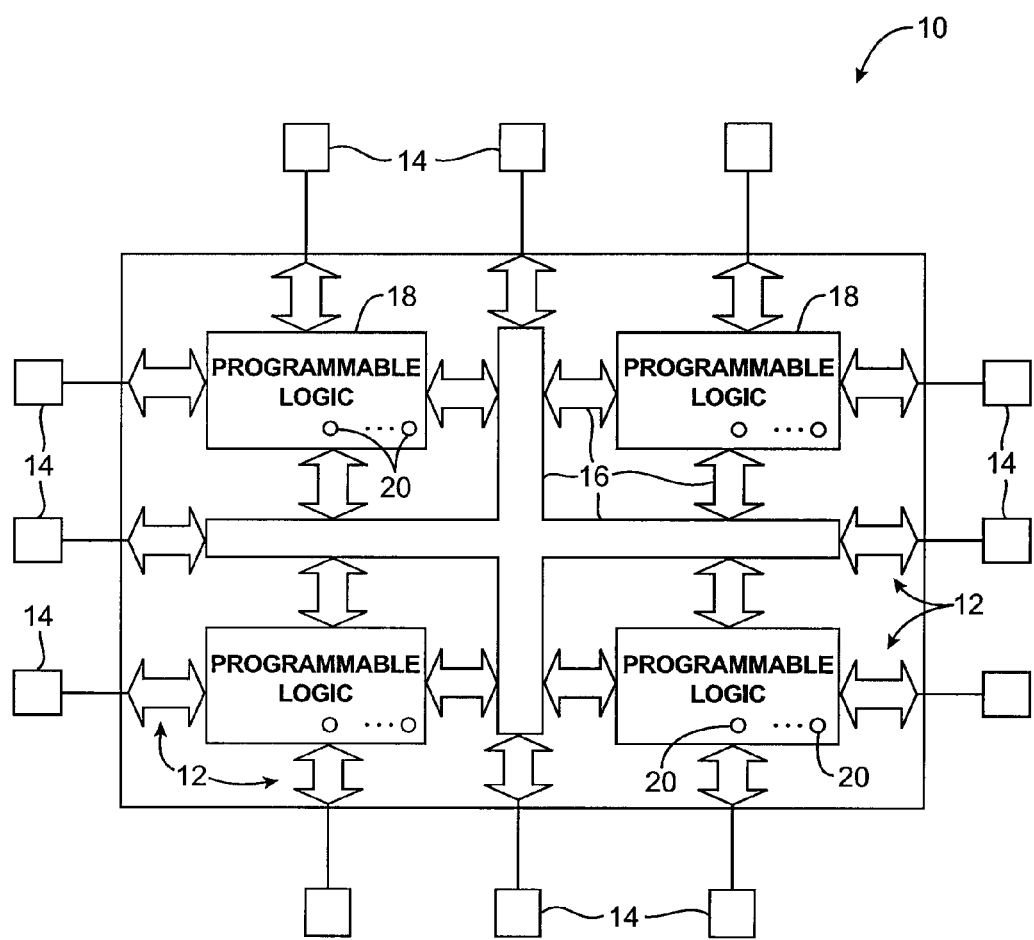
FIG. 1 is a diagram of an illustrative programmable logic device in accordance with the present invention.

An illustrative programmable logic device 10 in accordance with the present invention is shown in FIG. 1.

Programmable logic device 10 may have input/output circuitry 12 for driving signals off of device 10 and for receiving signals from other devices via input/output pins 14. Pins 14 may be any suitable types of pins or solder bumps for making electrical connections between the internal circuitry of device 10 and external packaging. Some of the pins 14 may be used for high-speed communications signals, other pins may be used to provide power supply voltages to the device 10 or may be used for DC or low-frequency signals.

Interconnection resources 16 such as global and local vertical and horizontal conductive lines and busses may be used to route signals on device 10. The remainder of the circuitry 18 on device 10 includes blocks of programmable logic, memory blocks, regions of digital signal processing circuitry, processors, etc. The programmable logic in circuitry 18 may include combinational and sequential logic circuitry including logic gates, multiplexers, switches, look-up-tables, logic arrays, etc. These illustrative components are not mutually exclusive. For example, look-up tables and other components that include logic gates and switching circuitry can be formed using multiplexers.

Some of the logic of programmable logic device 10 is fixed (hardwired). The programmable logic in device 10 includes components that may be configured so that device 10 performs a desired custom logic function. The programmable logic in programmable logic device 10 may be based on any suitable programmable technology. With one suitable approach, configuration data (also called programming data) may be loaded into programmable elements in the programmable logic device 10 using pins 14 and input/output circuitry 12. During normal operation of device 10, the programmable elements (also sometimes called configuration bits or programmable function control elements) each provide a static control output signal that controls the state of an associated logic component in the programmable logic of circuitry 18.

In a typical arrangement, the programmable elements may be random-access memory (RAM) cells that are loaded from an external chip via certain pins 14 and appropriate portions of input/output circuitry 12. The loaded RAM cells provide static control signals that are applied to the terminals (e.g., the gates) of circuit elements (e.g., metal-oxide-semiconductor transistors) in the programmable logic of circuitry 18 to control those elements (e.g., to turn certain transistors on or off) and thereby configure programmable logic device 10. Circuit elements in input/output circuitry 12 and interconnection resources 16 are also generally configured by the RAM cell outputs as part of the programming process (e.g., to customize I/O and routing functions). The circuit elements that are configured in input/output circuitry 12, interconnection resources 16, and circuitry 18 may be pass transistors, parts of multiplexers, look-up tables, logic arrays, AND, OR, NAND, and NOR logic gates, etc.

RAM-based programmable logic device technology is merely one illustrative example of the type of technology that may be used to implement programmable logic device 10. Other suitable programmable logic device technologies that may be used for device 10 include one-time programmable device arrangements such as those based on programmable logic elements made from fuses or antifuses (laser blown or electrically configured), programmable logic devices in which elements 20 are formed from electrically-programmable read-only-memory (EPROM) or erasable-electrically-programmable read-only-memory (EEPROM) technology, or programmable logic devices with programmable elements made from magnetic storage elements, etc. Illustrative programmable logic elements are shown schematically as elements 20 in FIG. 1.

The circuitry of device 10 may also be formed in a regular pattern that makes it amenable to rapid mask programming using special lithographic masks. With one suitable mask-programming arrangement, a customized mask that defines a layer of custom vias is used to program programmable logic device 10. The via hole locations on the mask may be defined using configuration data produced by a programmable logic device design tool.

Regardless of the particular type of programmable element arrangement that is used for device 10, programmable elements are preferably provided with configuration data by a user (e.g., a logic designer). Once provided with configuration data, the programmable elements selectively control (e.g., turn on and off) portions of the circuitry in the programmable logic device 10 and thereby customize its functions so that it will operate as desired.

The circuitry of device 10 may be organized using any suitable architecture. As an example, the logic of programmable logic device 10 may be organized in a series of rows and columns of larger programmable logic regions or areas each of which contains multiple smaller logic regions or areas. The larger programmable logic regions are sometimes referred to as logic array blocks (LABs). The smaller logic regions that are contained within the logic array blocks are sometimes referred to as logic elements. A typical logic element contains a look-up table and associated multiplexer circuitry.

These logic resources may be interconnected by interconnection resources 16 such as associated vertical and horizontal interconnection conductors. Interconnection conductors may include global conductive lines that span substantially all of device 10, fractional lines such as half-lines or quarter lines that span part of device 10, staggered lines of a particular length (e.g., sufficient to interconnect several logic areas), smaller local lines that interconnect small logic regions in a given portion of device 10, or any other suitable interconnection resource arrangement. If desired, the logic of device 10 may be arranged in more hierarchical levels or layers in which multiple large areas are interconnected to form still larger portions of logic. Still other device arrangements may use logic that is not arranged in rows and columns. Portions of device 10 (e.g., in input/output circuitry 12 and elsewhere) may be hardwired for efficiency. As an example, hardwired transmitter and receiver circuitry may be used to assist with high-speed serial communications functions. Hardwired digital signal processing circuitry (e.g., multipliers, adders, etc.) may also be used. Device 10 may also contain blocks of memory, which are sometimes referred to as embedded array blocks or random-access-memory blocks.

Figure 2:
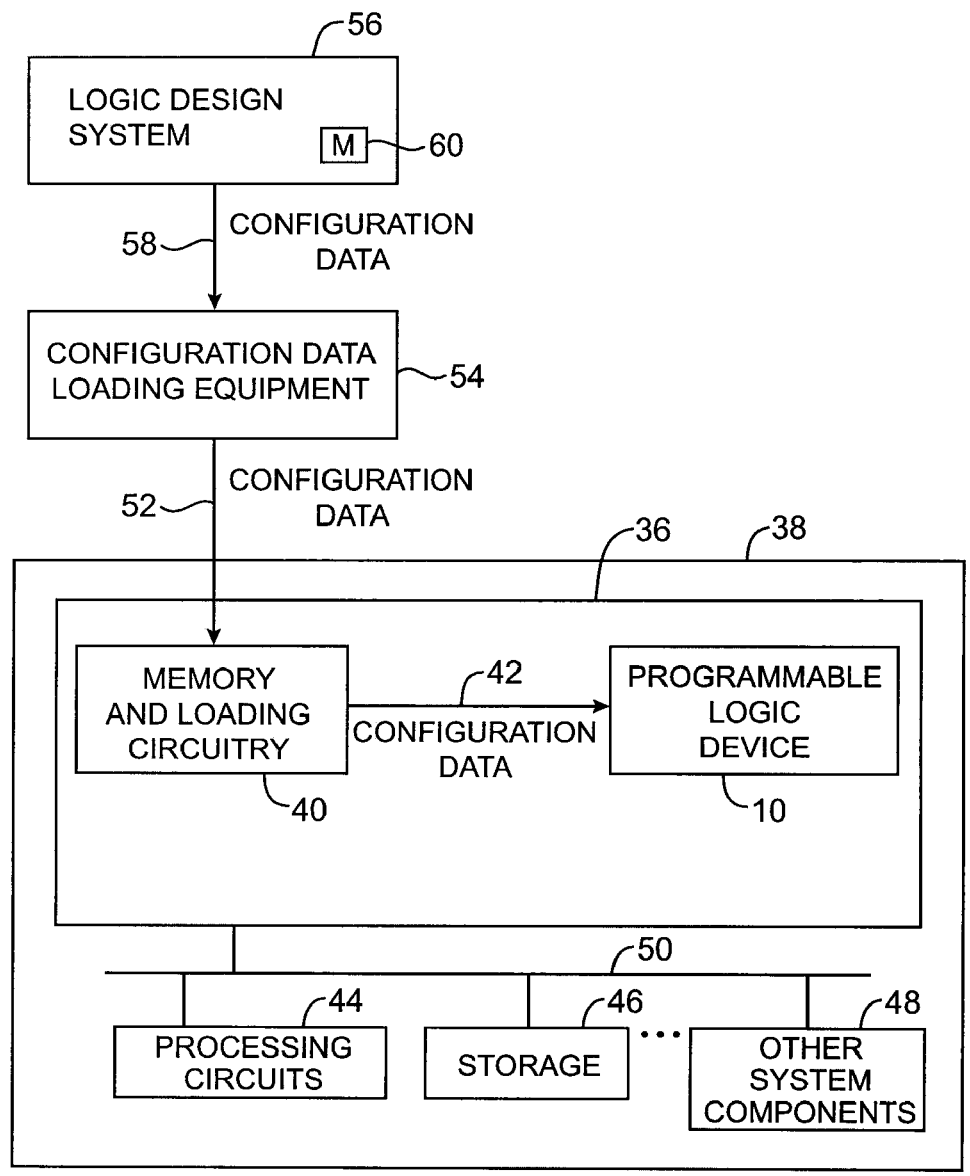
FIG. 2 a diagram of an illustrative system containing a programmable logic device in accordance with the present invention.

An illustrative system environment in which programmable logic device 10 may operate is shown in FIG. 2. Programmable logic device 10 may be mounted on a board 36 in a system 38. In general, programmable logic device 10 may receive programming data from any suitable equipment or device. In the example of FIG. 2, programmable logic device 10 is the type of programmable logic device that receives configuration data from associated memory and loading circuitry 40. With this type of arrangement, a memory chip and separate loading chip or an integrated memory and loading chip may, if desired, be mounted on the same board 36 as programmable logic device 10. The circuitry 40 may, for example, include erasable-programmable read-only memory (EPROM) circuitry for storing configuration data and programmable logic device configuration data loading circuitry for loading the data into device 10. When system 38 boots up (or at another suitable time), the configuration data for configuring the programmable logic device may be supplied to programmable logic device 10 from circuitry 40, as shown schematically by path 42. The configuration data that is supplied to the programmable logic device may be stored in the programmable logic device in configuration data cells (programmable memory elements 20).

System 38 may include processing circuits 44, storage 46, and other system components 48. The components of system 38 may be located on one or more boards such as board 36 or other suitable mounting structures or housings and may be interconnected by busses and other electrical paths 50.

Device 40 may be supplied with the configuration data for device 10 over a path such as path 52. Device 40 may, for example, receive the configuration data from configuration data loading equipment 54 or other suitable equipment. Data loading may take place before or after circuitry 40 is installed in system 38.

It can be a significant undertaking to design and implement a desired logic circuit in a programmable logic device. Logic designers therefore generally want to use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device or for producing a custom mask for a mask-programmed chip.

As shown in FIG. 2, the configuration data produced by a logic design system 56 may be provided to equipment 54 over a path such as path 58. The equipment 54 can provide the configuration data to device 40, so that device 40 can later provide this configuration data to the programmable logic device 10 over path 42.

In arrangements of the type shown in FIG. 2, the programmable logic device 10 may have configuration data cells formed from memory cells such as static random-access memory cells. This is merely one illustrative arrangement for programming a programmable logic device 10. Any suitable arrangement for programming programmable logic device 10 may be used if desired. For example, programmable logic device 10 may be based on non-volatile configuration data cells such as erasable-programmable read-only memory (EPROM) cells. With this type of arrangement, device 10 can be configured by programming the configuration data into the EPROM cells on the device. Programmable logic device 10 may also be mask-programmed or based on programmable elements such as fuses and antifuses or programmable elements based on other technologies (e.g., magnetic devices, etc.).

Regardless of the particular approach used for programming programmable logic device 10, programmable logic device 10 can be configured using configuration data produced by a logic design system 56.

Logic design system 56 includes storage 60. Software is used to implement the functions of system 56. The software may be stored on a computer-readable medium (storage) 60. Storage 60 may include computer memory chips, removable and fixed media such as hard disk drives, flash memory, compact discs (CDs), DVDs, and floppy diskettes, tapes, or any other suitable memory or storage device(s). When the software of system 56 is installed, storage 60 has instructions and data that cause the computing equipment in logic design system 56 to execute various methods (processes). When performing these processes, the computing equipment is configured to implement the functions of the logic design system 56.

Figure 3:
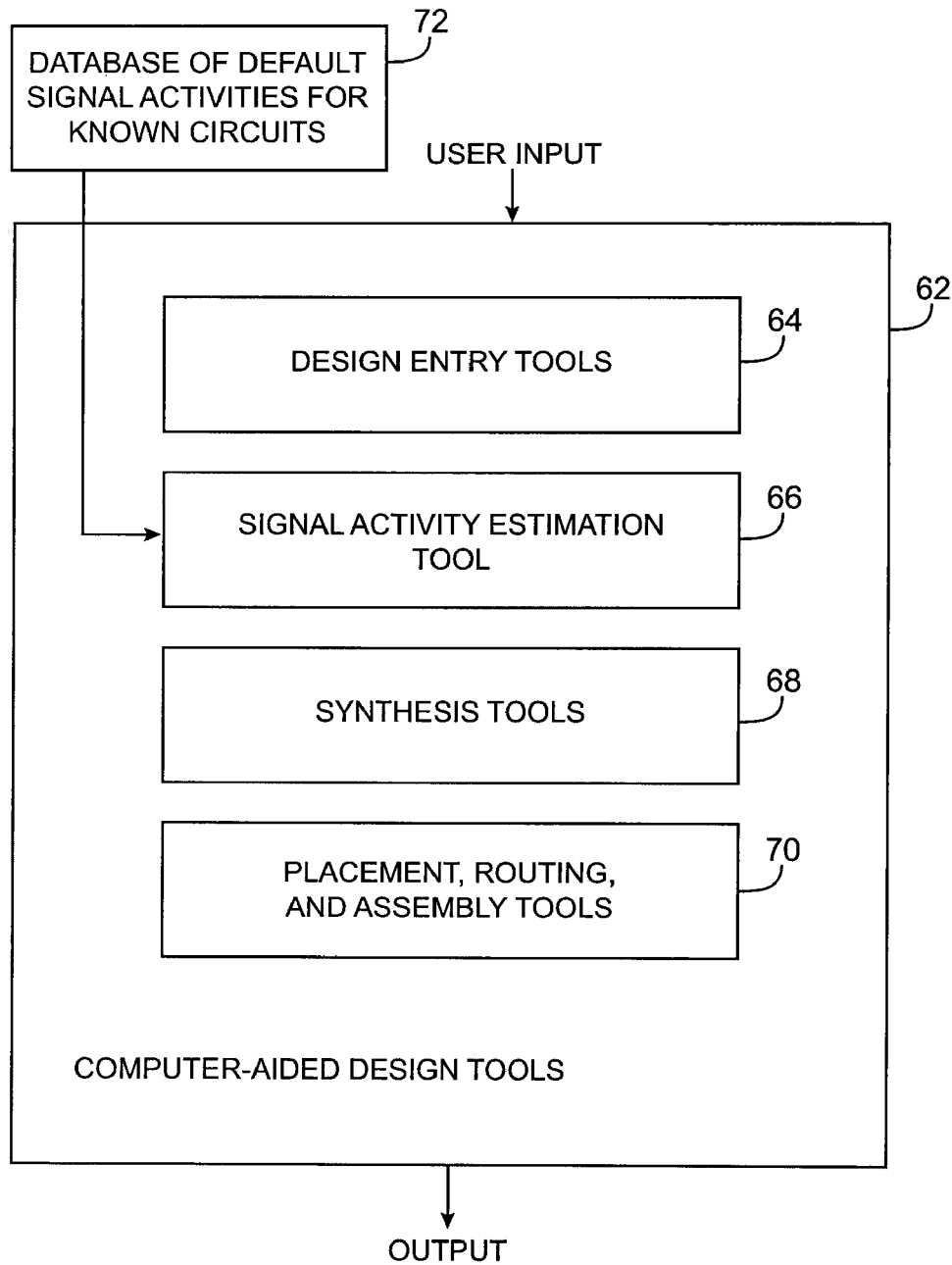
FIG. 3 is a diagram of illustrative computer-aided design tools that may be used to generate configuration data for a programmable logic device integrated circuit in accordance with the present invention.

Logic design system 56 may use computer-aided design tools such as tools 62 of FIG. 3. Tools such as tools 62 may be used to produce the configuration data for electrically programming the programmable logic device 10 from a set of design specifications or other suitable input. Tools such as tools 62 can also be used to generate output in other suitable formats (e.g., as specifications for a via-hole mask for mask-programming the device 10 or lithographic mask sets for semiconductor fabrication of other suitable circuits, etc.).

The design process typically starts with the formulation of logic circuit functional specifications. A logic designer can specify how a desired circuit should function using design entry tools 64. Design entry tools 64 may include design entry aids and design editors. Design entry aids help a logic designer locate a desired design from a library of existing logic designs and may provide computer-aided assistance to the logic designer for entering (specifying) the desired design. A design editor may be used to enter a design (e.g., by entering lines of hardware description language code), may be used to edit a design obtained from a library (e.g., using a design entry aid), or may assist a user in selecting and editing appropriate prepackaged code/designs.

Design entry tools 64 allow a logic designer to provide a desired logic design to logic system 56 using any suitable format. For example, design entry tools 64 may include tools that allow the logic designer to enter a logic design using truth tables. Truth tables can be specified using text files or timing diagrams and may be imported from a library. Truth table logic design entry may be used for a portion of a large circuit or for an entire circuit.

As another example, design entry tools 64 may include a schematic capture tool. A schematic capture tool may allow the logic designer to visually construct logic circuits from constituent parts such as logic gates and groups of logic gates. Libraries of preexisting logic circuits may be used to allow a desired portion of a design to be imported with the schematic capture tools.

If desired, design entry tools 64 may allow the logic designer to provide a logic design to the logic design system 56 using a hardware description language such as Verilog HDL or VHDL (Very High Speed Integrated Circuit Hardware Description Language). The logic designer can enter the logic design by writing hardware description language code with a design editor. Blocks of code may be imported from libraries if desired.

Using tools 64, a user (e.g., a logic designer or team of logic designers) can provide information on desired constraints for the design. For example, the user can provide information on timing constraints (e.g., maximum or minimum operating frequencies, latencies, etc.). The user can also provide information on what types of optimization the user desires tools 62 to perform. For example, the user can provide information on how much relative weight tools 62 should give to reducing dynamic power consumption in view of competing considerations such as reducing circuit real estate consumption and ensuring adequate timing performance.

The user can also provide information on expected signal activities levels. As an example, the user can specify that a particular circuit input will be receiving a clock signal or other logic signal that will be toggling at a particular frequency. The user can also provide information on static probabilities for various signals. Static probabilities indicate the fraction of time that a signal will have a particular value (high or low). User input on signal activity can be provided at any suitable stage. For example, user input can be provided later in the design flow (e.g., when interacting with tools 66, 68, and 70).

After the design has been entered using design entry tools 64, signal activity estimation tool 66 may be used to estimate signal activity levels for signals in the user's logic design. In general, signal activity may be estimated for any node (i.e., any circuit path, conductor, or line) that is specified in the design entered with tools 64. With one suitable arrangement, tool 66 estimates the toggling frequency and signal static probabilities associated with various circuit paths using statistical modeling.

If desired, information on expected signal toggling rates and static probabilities may be compiled for certain known circuits (e.g., by performing empirical studies, modeling studies, surveys, etc.). Such information may be stored in a database such as database 72. As an example, information may be stored in database 72 on the behavior of a look-up-table with particular settings (i.e., whether the look-up-table with those settings will produce a higher toggle rate at its output than is received at its input or whether the look-up table with those settings will produce a lower toggle rate at its output than is received at its input). It may be known, for example, that a look-up-table that implements a logic AND gate will tend to produce a lower output toggling rate than its input toggling rate. Signal activity estimation tool 66 can gather information on the expected signal activity levels associated with the signals in the user's circuit design by consulting the data on known circuits that is stored in database 72. Signal activity estimation tool 66 may be implemented as a stand-alone program or the functions of signal activity estimation tool 66 may be incorporated into other computer-aided-design tools 62 (e.g., tools 70).

Synthesis tools 68 may be used to perform logic synthesis operations on the design. During synthesis, logic circuitry is generated by translating the truth-table, schematic, and/or hardware-description language design specifications into lower-level circuit descriptions. Tools 68 may include functional simulation tools that simulate the functional performance of the design. If the functional performance of the design is incomplete or incorrect, the logic designer can make changes to the design using design entry tools 64. Once the functional operation of the logic design has been determined to be satisfactory, synthesis tool 68 may be used to implement the logic design in a particular programmable logic device and device technology During this process, which is sometimes called "technology mapping," a netlist representation of the logic design is translated into a representation of the design that is specific to the logic and interconnect resources of a particular programmable logic device product or product family. Tools 68 can help ensure proper selection of available hardware to implement different logic functions in the logic design. Often tradeoffs are made because multiple logic functions are competing for limited resources.

If desired, signal activity estimation tool 66 can interact with logic synthesis tools 68. For example, tool 66 can use information from tools 68 on which particular logic gates are being used in a given circuit design to improve its estimation of signal activities. Logic synthesis tools 68, in turn, can use information on estimated signal activities to enhance synthesis operations.

After estimating signal activities using tool 66 and performing logic synthesis using tools 68, the logic design system may use tools such as placement, routing, and assembly tools 70 to perform physical design steps (layout synthesis operations). Tools 70 are used to determine how to place the circuits for each logic function within the programmable logic device in an optimized way in view of competing considerations such as dynamic power consumption, timing performance, and real estate consumption. For example, if two state machines interact with each other, the tools 70 may locate these state machines in adjacent logic regions on the programmable logic device to minimize interconnect delays and thereby satisfy a timing constraint. As another example, the tools 70 may adjust logic circuit settings or may locate circuits on a device in a way that reduces dynamic power consumption in unused circuitry. The tools 70 create orderly and efficient implementations of logic designs for a given programmable logic device.

Tools 70 may analyze the performance of a given design using timing analysis algorithms. A timing analysis may, for example, be used to predict the delay times that are associated with certain signal paths through the device. Timing analyses may be used to verify that the particular implementation of the design that is being tested does not contain signal paths with delays that are outside of the limits imposed during the design phase. For example, the timing analysis algorithm may be used to ensure that the slowest data paths are fast enough that minimum desired clock speed and minimum signal path delay constraints are satisfied. The timing analysis algorithm may also examine the design for potential race conditions or other conditions that affect device performance.

In accordance with the present invention, the tools 70 are able to take into account the effects of dynamic power consumption by unused logic circuitry on a programmable logic device. By analyzing how much dynamic power is consumed due to various configuration data settings and circuit placement choices, tools 70 can optimize designs more effectively than with conventional design tools.

After satisfactory optimization using tools 70, the CAD tools 62 can produce electrical configuration data for electrically programming the programmable logic device, can produce configuration data for generating a via mask or other suitable lithographic mask for mask programming the programmable logic device, or can generate other suitable output data. Depending on the type of programmable logic device being used (e.g., a device based on non-volatile memory, a device based on volatile memory, a device based on fuses or antifuses, etc.), configuration data may be programmed into the programmable logic device directly, may be provided to a configuration device that later (e.g., upon power-up) loads the configuration data into the programmable logic device to program the device, etc.

Figure 4:
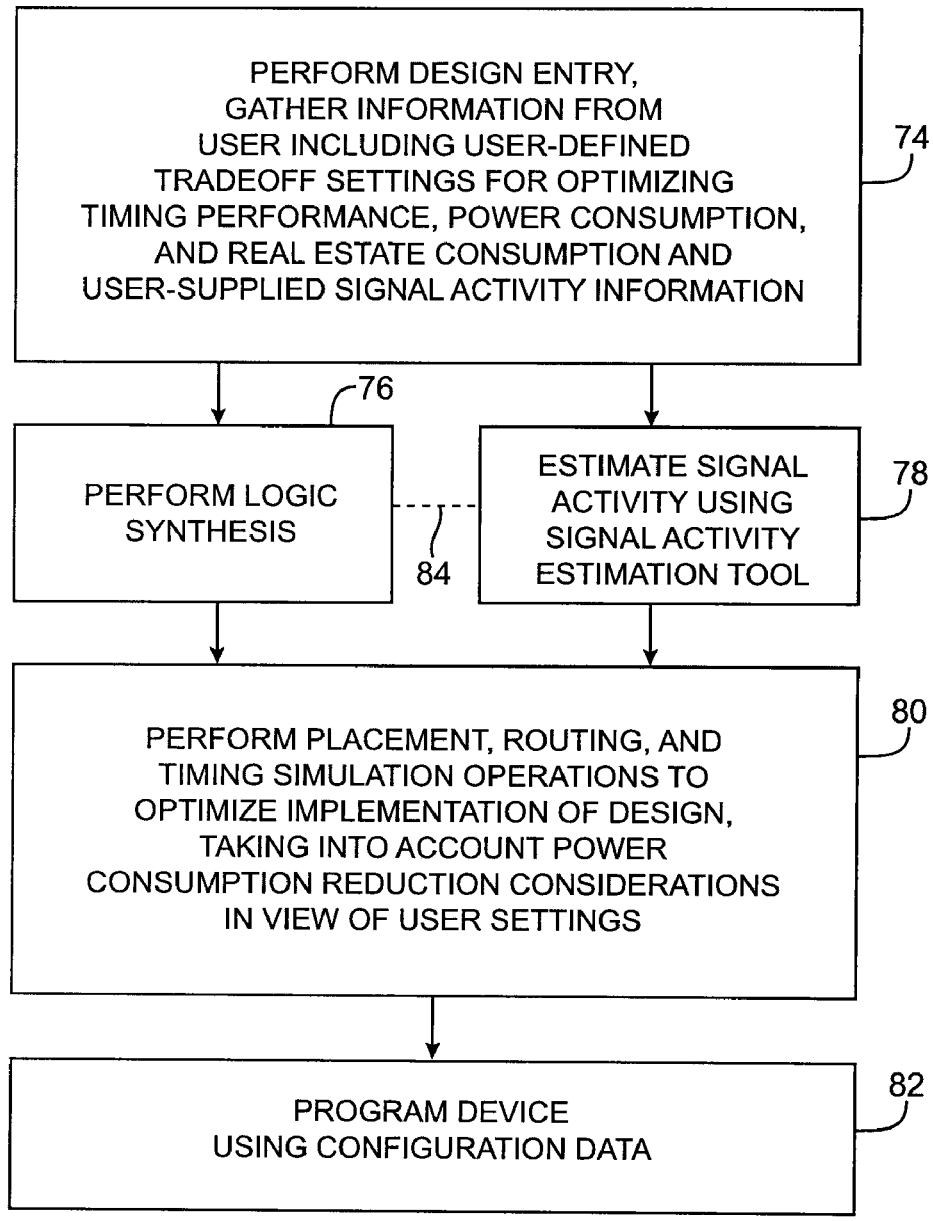
FIG. 4 is a flow chart of illustrative steps involved in using computer-aided design tools of the type shown in FIG. 3 to produce optimized programmable logic device implementations of desired custom logic functions in accordance with the present invention.

Illustrative steps involved in designing and programming an optimized programmable logic device are shown in FIG. 4. At step 74, a user can use design entry tools 64 (FIG. 3) to provide CAD tools 62 (FIG. 3) with design specifications. For example, the user can provide tools 62 with information on a desired logic circuit for a programmable logic device using hardware description language. The user can also provide tools 62 with information on design constraints (e.g., information on the minimum and maximum desired speed for the device or other suitable timing constraints, information on desired dynamic power consumption levels, information indicating the relative weights that the tools 62 should give to competing considerations such as timing performance, dynamic power consumption, and real estate consumption). The user inputs may, if desired, be provided using a screen of clickable options, fillable boxes, and drop-down menus. Inputs may be provided at any suitable time during the operation of tools 62. Tools 62 may also use information from logic design libraries, technology mapping databases (e.g., databases of information on various programmable logic device components), databases such as the database of default signal activities for known circuits 72 (FIG. 3), and other suitable databases.

At step 76, synthesis tools 68 (FIG. 3) may be used to perform logic synthesis operations on the user's desired design. Step 76 may involve testing a synthesized design for functional compliance with design specifications.

At step 78, the signal activity estimation tool 66 may use user input, information from design entry tools 64, information from database 72, and information from logic synthesis tools 68 to estimate signal activities for various portions of the user's circuit when the circuit is operating in a system. Signal activity levels may be represented using any suitable technique. For example, signal activity levels may be characterized by a toggle rate (e.g., 400 MHz), may be characterized by a signal probability (i.e., a value between 0 representing a static low signal and 1 representing a static high signal), may be characterized by both a signal probability and a toggle rate, or may be characterized by more coarse estimates of signal probability (e.g., a signal activity level or toggle rate of 1 for a used circuit block and a signal activity level or toggle rate of 0 for an unused circuit block). As indicated by dotted line 84, the signal activity estimation tool 66 can use output from synthesis tools 68 and synthesis tools 68 can use output from signal activity estimation tool 66.

Following successful synthesis operations at step 76 and signal estimation operations at step 78, tools 70 (FIG. 3) may be used to convert the user's desired logic design into configuration data (step 80). The configuration data that is created during the processing operations of step 80 represents an optimized logic design implementation in which the user's constraints on timing, dynamic power consumption, and circuit real estate consumption, are taken into consideration. During step 80, the tools 70 preferably analyze multiple possible implementations of the user's desired logic design in the programmable logic device while taking into account how configuration data settings and placement decisions will affect dynamic power consumption in unused circuitry (i.e., dynamic power consumption in regions of programmable logic in which no user functions are implemented).

The analysis of the various implementations that is performed at step 80 allows the tools 70 to be used to select an optimum implementation of the user's design in a given programmable logic device (family of programmable logic devices). Because this optimization takes into account dynamic power consumption effects, power consumption can be reduced while maintaining acceptable levels of performance. The tools 70 can produce a suitable output for the design during step 80 (e.g., by producing a configuration data file for electrical loading into a device 10 or for use in mask programming a device 10).

Once a satisfactory design has been obtained at step 80 and the configuration data has been generated, an arrangement of the type described in connection with FIG. 2 may be used to program the programmable logic device (step 82).

During the optimization operations of step 80 that are performed by tools 70, tools 70 select optimum configuration bit settings for programmable logic circuits in the programmable logic device and make power-reducing placement and routing decisions. As an example, tools 70 may select a setting for a programmable multiplexer that ensures that a register in an unused circuit region will receive a signal that toggles slowly rather than a signal that toggles rapidly. Even though the register is located in a logic region that is not being used to implement user logic, the register contains an input latch that consumes dynamic power if it is driven with a rapidly changing signal. Accordingly, setting a configuration bit so that the programmable multiplexer routes the slower toggling signal into the unused data register reduces power.

As another example, tools 70 may place circuit functions in locations that minimize the amount of interconnect structures that are driven. The tools 70 may, for example, place circuits so that the amount of location-dependent capacitive loading of a particular signal is minimized. If certain device locations are known to involve long interconnect lines and other particularly capacitive structures on the device, the tools 70 can minimize power consumption by making placement decisions that avoid such structures. For accurate results, tools 70 preferably use a physically-based model to calculate the power consumption by each such circuit structure under varying static probability and toggling rate conditions. Tools 70 may make circuit placement decisions so that functional circuit blocks do not straddle unused or unrelated resources. By avoiding the placement of functional blocks in areas that would involve the routing of signals over unused or unrelated logic, switched capacitance levels and therefore dynamic power consumption levels are reduced.

Tools 70 may also make placement decisions that reduce clock power. Clock power can be reduced by performing cost function calculations to determine how to lower clock usage at various levels of granularity.

Consider, as an example, the impact of adjusting configuration bit settings in a programmable logic device. In a programmable logic device, bit settings determine the function a block of logic circuitry performs. The bit settings for a block of logic are reflected in the values stored by configuration bits for the block of logic. In turn, the contents of the configuration bits (programmable elements 20) specify the functionality implemented by the device. In mask-programmed devices, bit settings are reflected in the programming masks that are used to fabricate the devices.

Typically, all unused elements in a programmable logic device have their bits set to a default state (e.g., all logic zeros or all logic ones). By selecting different bit settings for unused blocks of circuitry (e.g., unused logic elements or unused blocks of other sizes), the toggle rates associated with the signals feeding the unused blocks can be reduced or eliminated relative to the conventional default bit setting case. By lowering the frequency of signals that are applied to the inputs of unused blocks of circuitry, the amount of power that would otherwise be consumed unnecessarily by the circuits in the unused blocks can be reduced or eliminated.

Appropriate lower-power bit settings for a block of logic circuitry can be determined independently (i.e., without knowledge of the condition of adjacent blocks) or can be determined dependently (i.e., using knowledge on the status of nearby circuitry).

An independent power-reducing bit-setting decision is a decision that can be made with no knowledge of other blocks or signal activities. Such decisions are static decisions made before compiling a circuit with CAD tools 62. An independent decision can be used to generate new default bit settings for a block.

Figure 5:
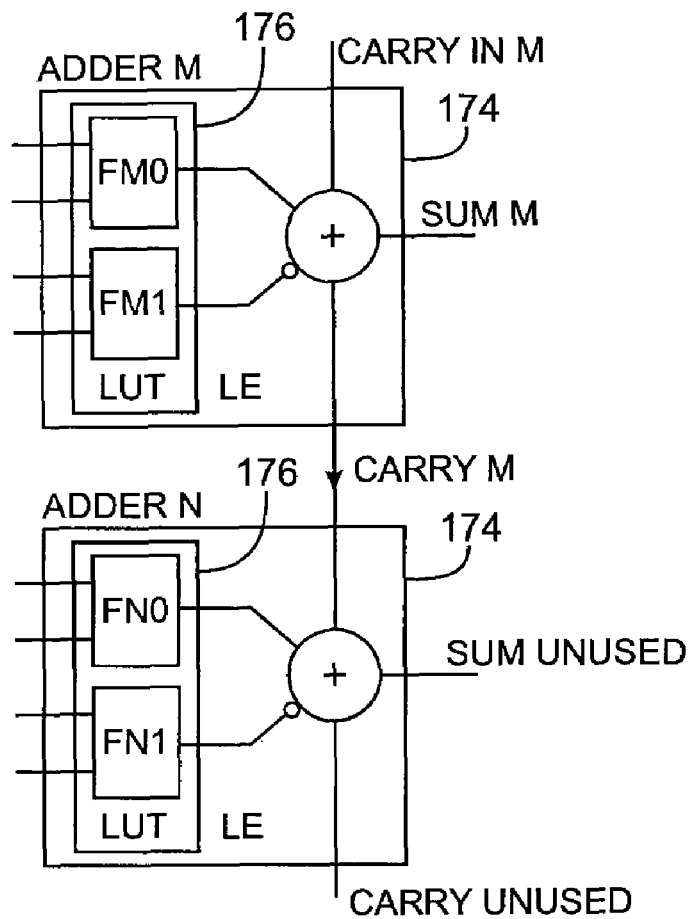
FIG. 5 is circuit diagram showing how dynamic power consumption can be reduced by evaluating the impact of power consumption due to an unused carry signal in accordance with the present invention.

Commercially-available programmable logic architectures often use one programmable lookup table (LUT) to implement a full adder. FIG. 5 shows how programmable logic elements 174 (LEs) may be used to implement adders (AdderM and AdderN). Each LE contains a 4-LUT 176 and other circuitry (e.g., registers and programmable gates). Each 4-LUT is configured using 16 programmable elements 20 (configuration bits). Each LUT generates both a sum result and a carry result for each bit in the sum. To implement a k-bit adder, k logic elements are chained together, so that the carry out value of one logic element is connected to the carry in port of the logic element computing the next significant bit in the sum.

As shown in FIG. 5, logic element AdderM produces SumM and CarryM which are, respectively, the sum and carry of the two 1-bit functions FM0 and FM1 (implemented with a LUT 176) and the 1-bit CarryInM value. Similarly, logic element AdderN includes adder hardware which consumes the CarryM value from AdderM and produces a sum and carry bit. In the example of FIG. 5, the sum and carry signals produced by AdderN are not used by the user's circuit design.

The timing critical path in an adder often runs through the carry chain, so the carry connections between adjacent logic elements usually use a dedicated low-delay conductive line. Furthermore, to minimize the carry delay, no pass transistors are included in the carry path, so the carry connection cannot be shut off. The carry out signal of a carry chain may therefore cause toggling in the next logic element in line, whether or not that logic element is used by the user's circuit. This can lead to undesirable dynamic power consumption.

Furthermore, unused logic elements are normally configured with bit settings that reduce overall static power. For example, the 16 bit settings of a 4-input LUT are typically configured to be all ones, which reduces static power. However, using all-ones settings may increase toggle rates unnecessarily.

Consider, as an example, the situation of FIG. 5 in which AdderM is the last element in the carry chain of a user design. CarryM, the carry output from AdderM, will toggle based on the bit settings of FM0 and FM1 and the carry input. Consider the LUT settings for unused logic element AdderN. If FN0 and FN1 are configured with an all-ones settings (lutmask), then the output of FN0 and FN1 are both always 1. Note that the inversion of FN1 (i.e. ~FN1) is presented to the hard adder. The behavior of the adder block is as follows:

$$SumUnused = XOR(FN0, \sim FN1, CarryM)$$
$$= XOR(1, 0, CarryM)$$
$$= \sim CarryM$$

$$CarryUnused = \text{Marjority}(FN0, \sim FN1, CarryM)$$
$$= \text{Majority}(1, 0, CarryM)$$
$$= CarryM$$

As the SumUnused and CarryUnused equations indicate, if the FN0 and FN1 functions are configured with the all-ones configuration bit settings, then whenever the carry input toggles, both the sum and carry out will also toggle. As a result, unused logic elements will propagate toggles from carry inputs to both carry and sum outputs.

Given that CarryM may toggle and that AdderN is unused, tools 62 can generate a set of bit settings for functions FN0 and FN1 that reduce the toggle rate of SumUnused and CarryUnused to reduce toggling and hence dynamic power consumption. For example, tools 62 may configure function FN0 to the all-ones configuration bit settings (as before), whereas the function FN1 is assigned all-zeros configuration bit settings. In this case, SumUnused=CarryM, and CarryUnused=Majority(1, 1, CarryM)=1. By using these optimized bit settings as defaults, toggles from CarryM are still propagated to SumUnused, but are eliminated from CarryUnused. Because CarryUnused no longer toggles, dynamic power consumption in the unused circuitry is reduced.

Note that this example is illustrative only. Other types of programmable logic exhibit similar characteristics, i.e., logic blocks that are not required to implement a user design and that naturally propagate toggles from inputs to outputs.

There are two approaches tools 62 can use for making an independent decision on low-power bit settings for unused blocks.

With a first approach, tools 62 can make decisions based on the type of circuit that an unused block is implementing. As described in connection with the unused adder example of FIG. 5, tools 62 can determine the optimal low-dynamic-power bit settings for each block type. This approach requires no knowledge of what circuit design is being implemented by the logic designer.

Figure 6:
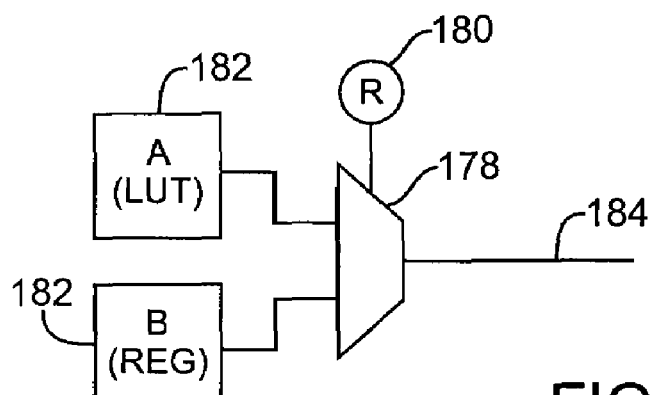
FIG. 6 is a circuit diagram showing how a multiplexer can be configured to reduce dynamic power consumption in accordance with the present invention.

With a second approach, tools 62 can make decisions using statistical techniques (i.e., techniques in which settings choices are made based on knowledge gathered from a database of default signal activities for known circuits). Tools 62 can use information on average toggle rates gathered from a set of known designs. An example is shown in FIG. 6. In FIG. 6, two logic circuits 182 (labeled A and B) produce outputs that feed multiplexer 178. Configuration bit 180 controls which of the two inputs to multiplexer 178 is connected to the output of multiplexer 178. The output signal from the multiplexer 178 is provided on line 184. Line 184 and the signal on line 184 are unused, but are connected to downstream circuitry (e.g., a multiplexer input). Line 184 and the connected downstream circuitry have an associated capacitance, so dynamic power consumption can be reduced by choosing configuration bit settings with tools 62 that reduce the toggle rate on line 184.

If the circuits in circuit blocks A and B are of different types, the lower-power bit setting for multiplexer 178 can be determined by comparing the average toggle rate for blocks of type A and blocks of type B. Whichever type of block has the lowest toggle rate should be selected by tools 62 to reduce power. In a typical programmable logic device logic element, there are output multiplexers that drive outputs onto interconnect lines. The inputs of the multiplexer are used to select between a register output and a look-up-table output (shown as the look-up table of block A and the register of block B in the example of FIG. 6). Because registers generally toggle less than look-up-tables, tools 62 can generate default configuration data that switches the multiplexers in unused logic elements to select the register output (block B) instead of the look-up table output (block A). This second approach reduces dynamic power consumption without requiring tools 62 to have knowledge of the user circuit design that is being implemented. Tools 62 need only identify unused logic blocks (e.g., LEs in which no user logic is being implemented by the logic designer) and generate appropriate corresponding configuration data. This approach is applicable to any suitable logic block. For example, this approach applies to logic blocks such as lookup tables (LUTs), adders (including plain XOR-gates), multiplexers, registers, multipliers, routing buffers, clock buffers, and clock networks.

A dependent power-reducing bit-setting decision is a decision that can be made based on information about the actual user logic circuitry that is being implemented in the programmable logic 18 of device 10. Information that tools 62 may use includes information on circuit connectivity, logic circuit block type, and signal activity data for signals and paths in the vicinity of unused blocks. A dependent decision should be deferred until the point in the operation of CAD tools 62 where the used portions of the programmable logic device (field-programmable gate array) have been determined, i.e., after placement operations have been performed.

CAD tools 62 can make dependent bit setting decisions based on which blocks are unused. For example, if either block A or block B in the circuit of FIG. 6 is unused, the configuration bit 180 can be set so that the multiplexer 178 connects the output of the unused block (A or B) to output line 184. Selecting the unused block in this way will eliminate toggles on line 184 and will therefore reduce dynamic power consumption. This approach requires CAD tools 62 to have knowledge of which blocks A and B are being used.

CAD tools 62 can also make configuration bit setting decisions that are dependent on the logic functions that are being implemented in various blocks. For example, it is known that the outputs of AND gates typically have lower toggle rates than the outputs of XOR gates. A multiplexer that has a choice between connecting the output of an AND gate or the output of an XOR gate to the multiplexer's output will tend to reduce dynamic power consumption by selecting the AND gate output. This type of dynamic decision requires knowledge of the implemented circuit.

If desired, CAD tools 62 can make configuration bit setting decisions that are dependent on signal activity information such as signal toggle rates and static probabilities. The CAD tools 62 generally have access to signal activity data for signals in the design.

Consider, for example, the process of making decisions based on toggle rates. Bit settings may be chosen to ensure that a block whose output toggle rate is lower than another block's output toggle rate is selected (e.g., by a multiplexer or other switch). Configuration bit settings such as these may be based on actual expected signal activities rather than average signal activities to ensure a more accurate decision and to allow the power of the unused resources (e.g., multiplexers) to be minimized. This approach requires knowledge of the circuit being implemented and knowledge of its associated signal toggle rates. The toggle rates may be obtained from user input or signal activity estimation tool 66 (FIG. 3).

Decisions may also be made based on static probability data. The static probability for a signal is 0 if that signal is expected to always be low, is 1 if that signal is expected to always be high, or has an intermediate value (e.g., 0.1, 0.2, 0.99, etc.) to reflect the amount of time the signal is expected to be high versus low. For example, a signal probability of 0.99 would indicate that a signal is nearly always expected to be high.

In some situations, the lowest dynamic power consumption level that can be achieved is not obtained by choosing a signal that toggles the least, but rather is achieved by choosing a signal with the lowest static probability. This can occur, for example, when a clock enable signal is involved. When a clock enable signal on a register is held low, the register does not accept incoming data. The register therefore toggles less and consumes less power.

Figure 7:
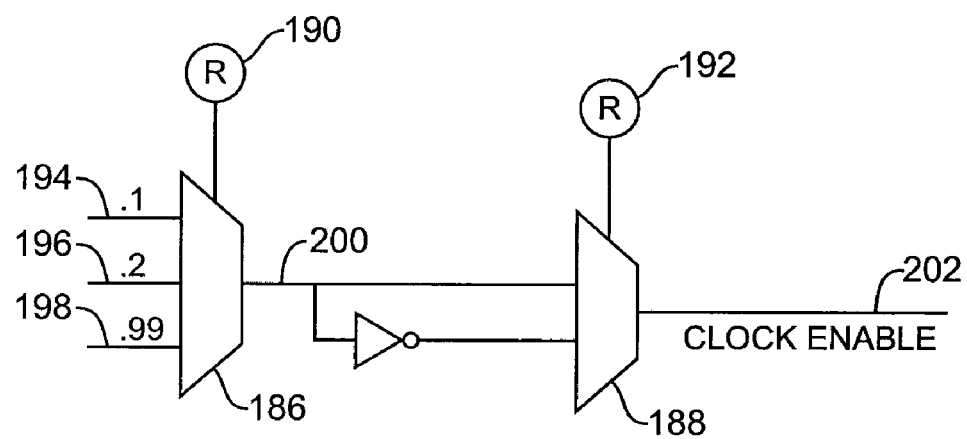
FIG. 7 is a diagram showing how computer-aided design tools can take into account signal static probabilities and signal toggling rates in determining how to minimize dynamic power consumption in accordance with the present invention.

Consider the example of FIG. 7. In FIG. 7, multiplexers 186 and 188 are controlled by the states of associated configuration bits 190 and 192. Lines 194, 196, and 198 receive logic signals from user logic on the device 10, even though the circuitry of FIG. 7 is located in an unused logic region. Assume that the static probability associated with input line 194 is 0.1, the static probability associated with input line 196 is 0.2, and the static probability associated with input line 198 is 0.99. Multiplexer 188 can be adjusted to invert or to not invert the output signal from multiplexer 186 on line 200 to produce a corresponding clock enable signal on line 202. By appropriately setting configuration bit 190, the input line 198 is selected with multiplexer 186 and the static probability on line 200 will be 0.99. By inverting this signal with multiplexer 188, the static probability of clock enable line 202 will be 0.01 (i.e., nearly zero). These choices ensure that the clock enable signal is held low for a majority of the time. Unused registers that are controlled by that clock-enable signal will consume less power, so dynamic power consumption on the device 10 will be reduced.

Tools 62 can take into account tradeoffs when considering both static probability and toggling rates. In some situations, the minimum power configuration for unused resources may depend upon the actual values of the toggle rates and static probabilities. If, in the example of FIG. 7, the toggle rates of the inputs to multiplexer 186 are skewed (some high, some low) and the static probabilities are all near 0.5, then one optimal configuration would be to configure multiplexer 186 to select the signal with the lowest toggling rate, so as to minimize dynamic power losses in multiplexer 186 and downstream interconnects. In another situation, if the inputs to multiplexer 186 toggle at the same rate but have skewed static probabilities (some near 0.5 and some near 1), then an optimal configuration for multiplexer 186 would be to select the input signal whose static probability is far from 0.5. In this case the dynamic power of multiplexer 186 cannot be optimized, but this particular configuration of multiplexer 186 allows the clock enable signal on line 202 to have a static probability very near 0, which minimizes dynamic power consumption in the downstream registers controlled by the clock enable signal.

CAD tools 62 preferably use physically-based models to accurately model power consumption by each unused circuit under varying static probabilities and toggling conditions.

CAD tools 62 can minimize the amount of unused circuitry that is toggled by placing user logic in appropriate locations. In particular, the CAD tools 62 can minimize the amount of capacitance that is toggled in unused circuitry based on knowledge of undesirable placement locations. By ensuring that user logic functions are not implemented in poorly-chosen locations, dynamic power can be reduced.

A given functional block from a user's design may be implemented by many functionally-equivalent hardware blocks on a given programmable logic device. For example, a LUT from a user's design may potentially be placed in many logic block locations on the device that are available to implement LUT functionality. Although functionally equivalent, different block locations of the same type will differ in their parasitic capacitance. That is, each of the functionally equivalent hardware blocks (e.g., logic elements or other logic regions) will have its own particular capacitance due to the specific conductive paths and transistors attached to that block. To optimize dynamic power consumption, it is advantageous to place high toggling user blocks into hardware block locations that experience minimum capacitance due to the presence of unused blocks.

Figure 8:
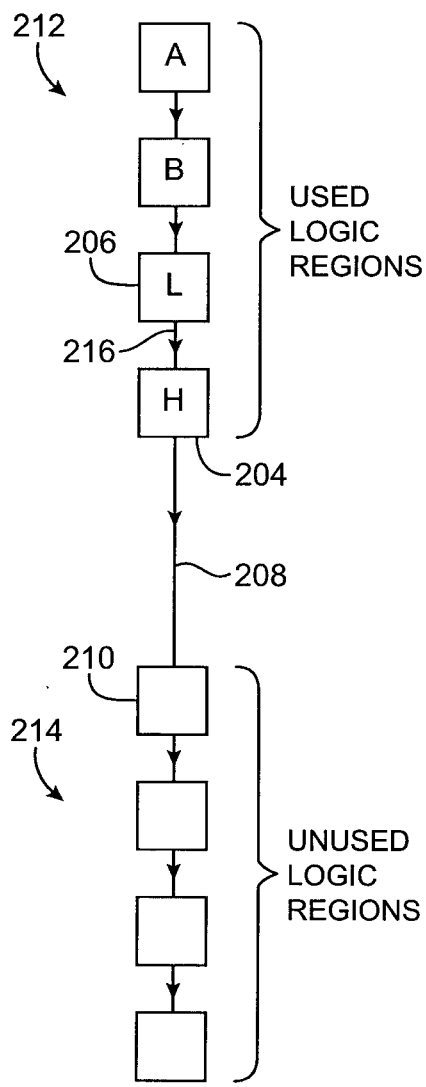
FIGS. 8 and 9 are circuit diagrams showing how power consumption can be reduced by placing circuits that toggle at high rates in low-capacitance locations on a programmable logic device integrated circuit in accordance with the present invention.

For example, FIG. 8 shows eight logic blocks containing look-up tables. Each logic block has a dedicated carry output (drawn vertically down from each block). Each carry output connects one LUT to the next LUT in sequence. The logic blocks 212 contain user logic (i.e., functions A, B, L, and H). The logic blocks 214 are unused. Although blocks 214 are unused, topmost block 210 dissipates power when carry line 208 is toggled by the activity in block 204.

It is normal for the connections such as the carry connections of FIG. 8 to differ in their capacitance depending on their location. For example, while LUTs 206 and 204 in FIG. 8 are functionally equivalent, the carry output 216 from LUT 206 has a low capacitance and the carry output 208 from LUT 204 has a high capacitance.

This type of variation is expected due to the physical groupings of logic blocks on programmable logic devices.

Certain groups of blocks are separated by relatively larger gaps, which leads to the presence of certain carry connections that are longer than others. As an example, a fixed number of logic elements may be grouped into a LAB and routing channels may be placed between LABs. In this type of situation, the carry connection from the last logic element in one LAB to the first logic element in the next LAB (e.g., a carry connection such as carry connection 208) has much higher capacitance than the carry connection between two logic elements between two LABs (such as carry connection 216). There may also be variations within a single LAB. For example, each LAB contains logic to process control signals for registers in the LAB. Any carry connections that cross this control signal logic will likely travel a greater distance than other carry connections within the same LAB and will therefore have higher capacitance.

Figure 9:
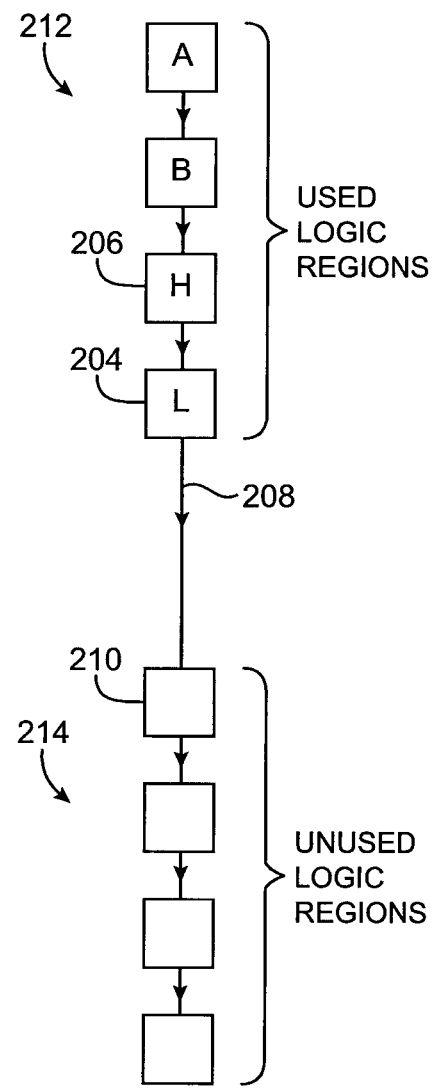

In the example of FIG. 8, the block labeled "H" produces a rapidly toggling output and the block labeled "L" produces a slowly toggling output. To minimize dynamic power consumption, it is preferable to place a high toggling LUT from the user design in hardware LUT blocks which have lower capacitance. If the high toggling LUT function is implemented within block 204 of FIG. 8, the carry line 208 will toggle rapidly, leading to a large dynamic power consumption in unused block 210. If, however, the positions of the high and low toggling functions are reversed, as shown in FIG. 9, the low-toggling output from block L will be conveyed to unused block 210 over line 208. Because the line 208 toggles less rapidly in the arrangement of FIG. 9 than in the arrangement of FIG. 8, the CAD tools 62 can reduce dynamic power consumption by generating configuration data that locates the logic functions as shown in FIG. 9, rather than as shown in FIG. 8.

CAD tools 62 can determine which logic blocks in a user's design toggle more often than others using any suitable technique. For example, CAD tools 62 can determine the actual toggle rate of a particular logic block by performing simulations or gathering user input. CAD tools 62 can also estimate the toggle rate of a particular logic block by vectorless estimation techniques. If desired, CAD tools 62 can estimate the relative activity between two particular user logic blocks by examining their functionality only. For example, CAD tools 62 can examine LUT configuration data settings only (e.g., an AND gate will tend to toggle less than an XOR gate). As another example, CAD tools 62 may compare the number of inputs on various logic blocks. A logic block with a large number of inputs is more sensitive to input changes. For example, a 4-input XOR gate is will tend to toggle more than a 2-input XOR gate. However, LUT settings also play a large role. For example, all things otherwise being equal, a 4-input AND gate will tend to toggle less than a 2-input AND gate because there is a greater opportunity for a 0 input to be present on the input of this type of gate.

The capacitance being minimized by the CAD tools may arise from hardware components (metal and transistors) which are not being used by the user's functionality. For example, as described in connection with FIGS. 8 and 9, CAD tools 62 would prefer to place a user LUT in hardware block 206 rather than in hardware block 208, even if the user's desired LUT function does not require the carry output functionality of the hardware block. That is because the hardware block will tend to toggle the carry output path regardless of the needs of the user's logic function. In this sense, the CAD tools 62 minimize parasitic capacitance, not just the capacitance required in performing a user logic function.

The CAD tools 62 may determine which functional blocks have more or less capacitance than others using any suitable technique. With one suitable arrangement, tools 62 use a rule that is based on block position (e.g. modular arithmetic on LUT coordinates to determine relative location within a LAB). With another suitable arrangement, tools 62 use a database to determine the capacitance of each hardware functional block. The data for the database may be stored in aggregate form (e.g., hardware LUT block A has a certain total capacitance). Alternatively, the data may be stored by each particular path and transistor resource, in which case the tools 62 can aggregate the capacitances (e.g. hardware LUT block A has these associated capacitances: carry out line, carry out buffer, sum out line, sum out buffer).

The capacitances being minimized may include capacitances produced by conductors connected to pieces of metal, conductors connected to transistors, and coupling capacitance that arises when a conductor is near to but not connected to another conductor.

The CAD tools 62 may minimize dynamic power consumption in any suitable circuitry. In LUTs, the tools 62 can reduce the capacitance associated with a carry output and a regular output. In registers, the tools 62 can reduce the capacitance associated with register scan chain outputs (including those only used during device test). In multiplier scan chains, the tools 62 can reduce the capacitance associated with the inputs to multipliers and adder chains. The tools 62 can also reduce capacitance associated with interconnections (e.g., routing switches and conductors) and other types of functional blocks with varying intrinsic capacitances.

Dynamic power consumption can be minimized by avoiding the placement of logic functions in locations that lead to the straddling of unused or unrelated resources. The CAD tools 62 preferably implement the user design so as to avoid having to route user signals over hardware that is present in the device but is unused by the users' circuit or that is unused by that portion of the user's circuit.

Figure 10:
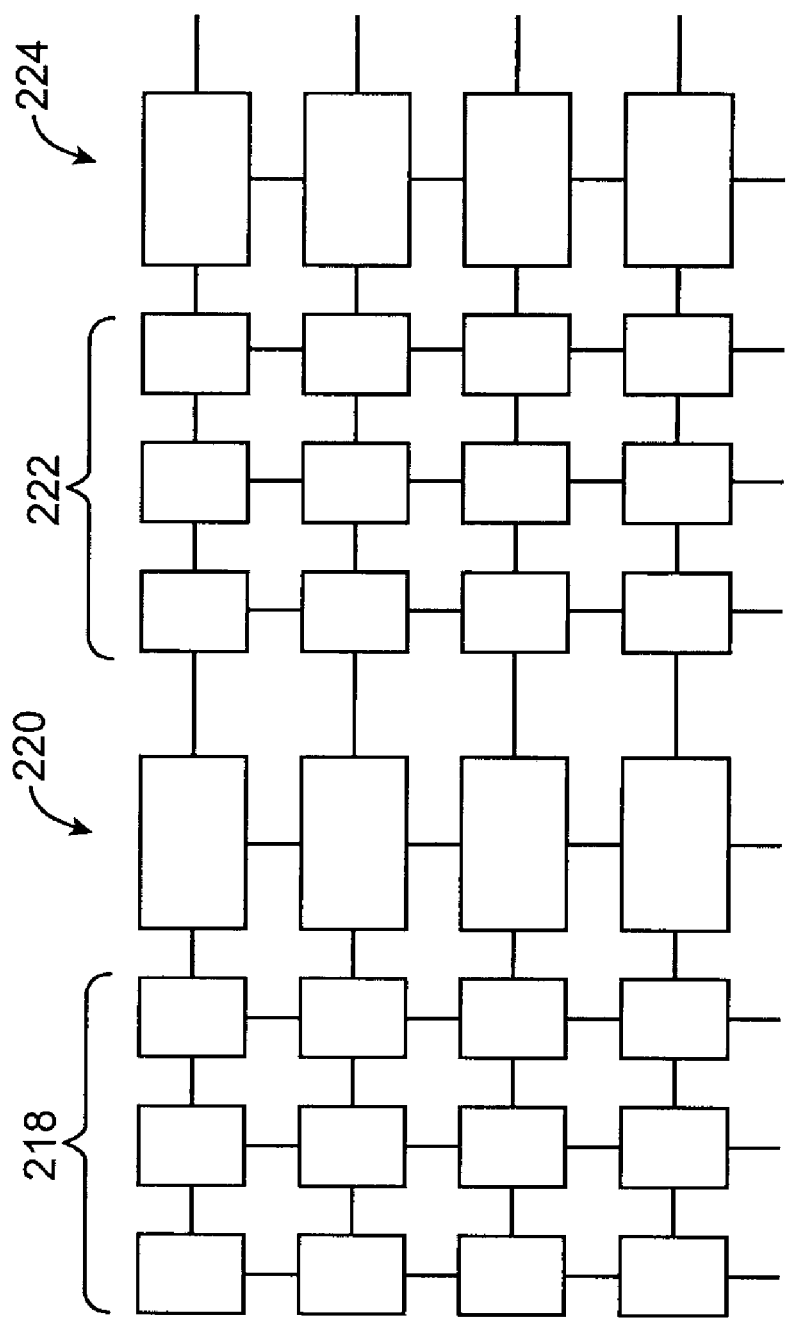
FIGS. 10-14 are circuit diagrams illustrating how computer-aided design tools can evaluate the impact on dynamic power consumption due to logic blocks where signals pass through unused or unrelated logic blocks in accordance with the present invention.
Figure 11:
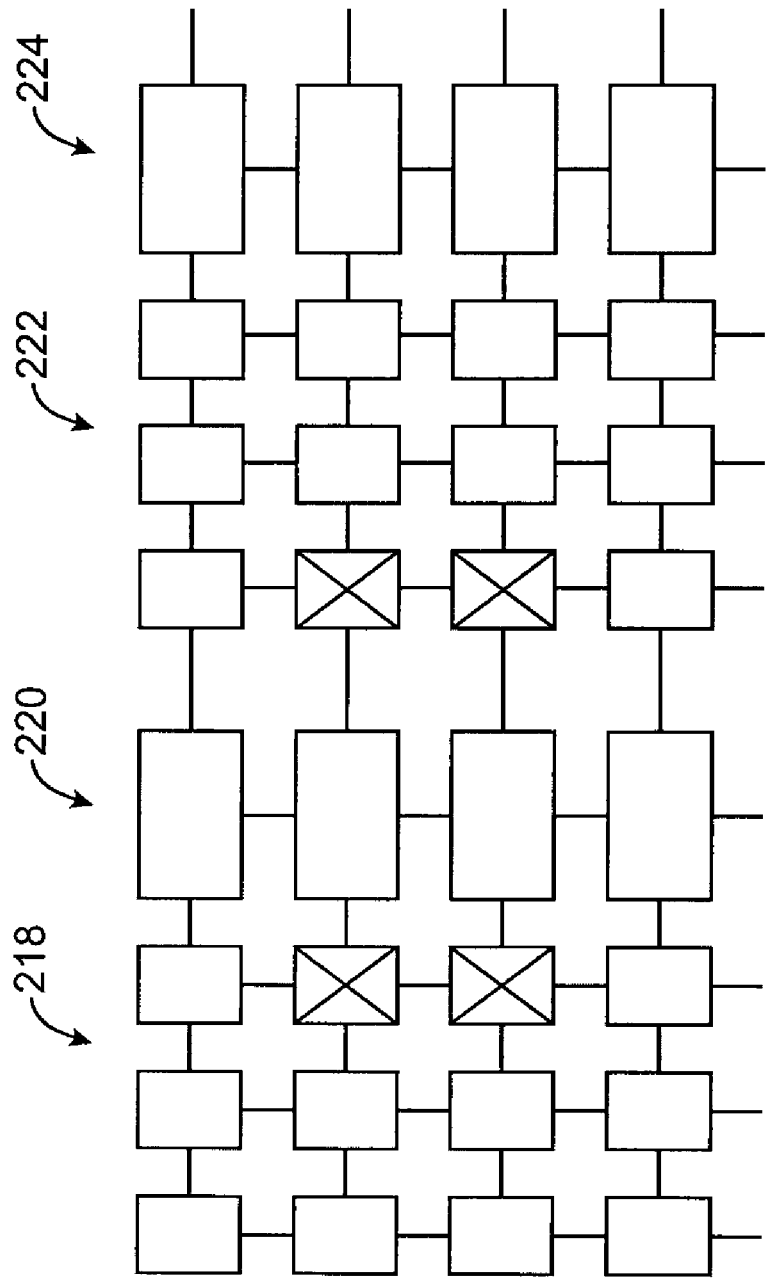
Figure 12:
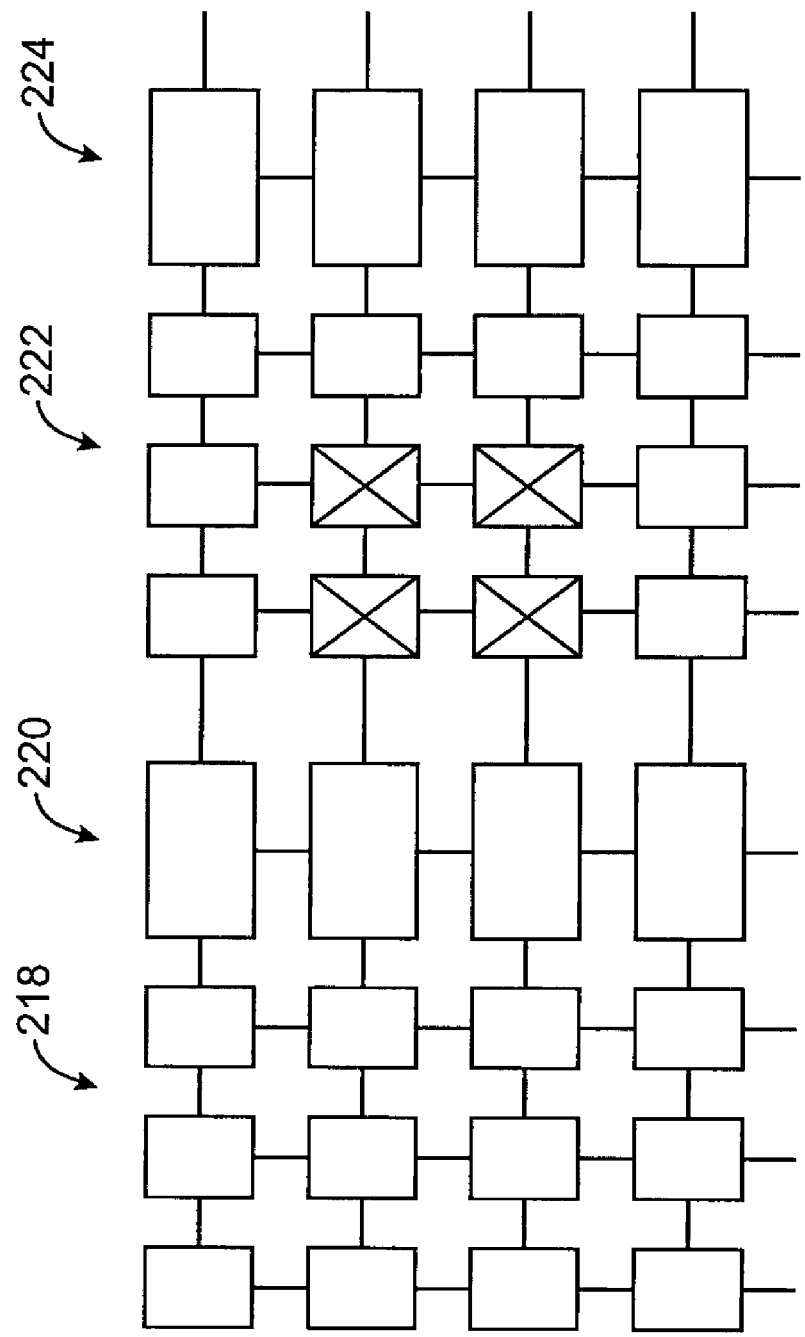

The tools 62 place each user logic module so as to avoid straddling hardware resources that are not used when implementing the user's design. For example, FIG. 10 shows a portion of a programmable logic device containing regions of logic array blocks (LABs) 218 and 222, a column of special-purpose multiplier (or digital signal processor) blocks 220, and a column of random-access-memory blocks 224. A user's circuit may use only general logic (LABs). In an unoptimized placement, such as shown by the marked blocks in FIG. 11, the user's circuit will be placed so that some logic will be implemented in one region of LABs and the rest of the logic in a different region of LABs, where the two regions of LABs 218 and 222 are separated by special purpose hardware blocks 220 that are unused by the user's circuit, (e.g., multipliers). This placement is disadvantageous because the signals crossing the multiplier column 220 must use more routing wire and hence have higher capacitance. Therefore, as the user's circuit operates, a relatively large amount of power is dissipated in the routing that crosses the unused special purpose blocks. In the optimized placement shown in FIG. 12, all the logic that is used (as indicated by the marked LAB blocks) is placed in one region of LABs 222. As a result, none of the signals between the user's LABs must cross unused logic. The routes for those signals are therefore shorter and have lower capacitance. These routes will consume less power than they would have in the unoptimized placement of FIG. 11.

The CAD tools 62 can also place a group of functional blocks so that they do not straddle hardware used to implement a different part of the user's design. For example, suppose user module A is implemented in two LABs and two multiplier blocks, whereas user module B is implemented in four LABs. In addition, suppose that module A is tightly coupled to itself (i.e., module A has many rapidly toggling signals connecting module A to itself), that module B is also tightly coupled to itself, and that modules A and B are not tightly coupled to each other.

Figure 13:
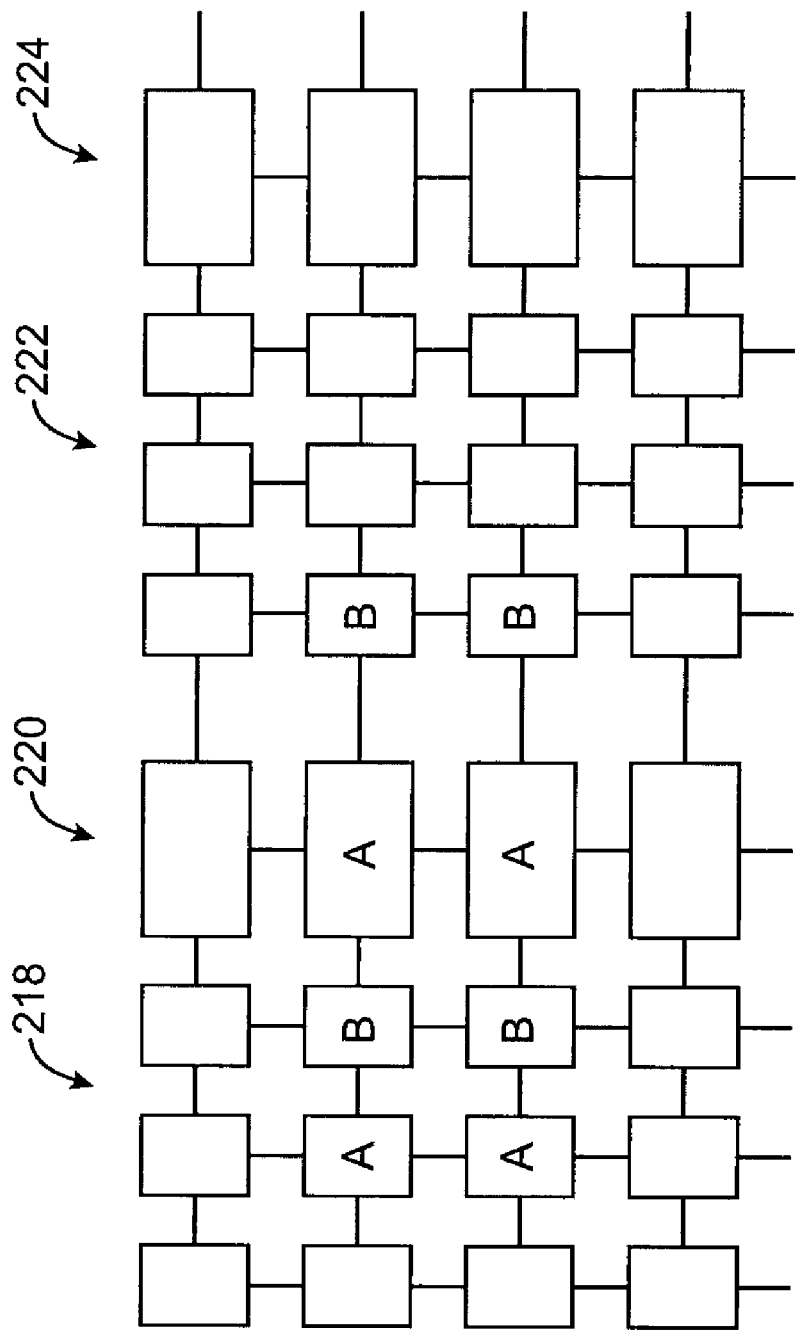

FIG. 13 shows an unoptimized placement for this type of design whereby the blocks implementing module A straddle some blocks implementing module B and whereby the blocks implementing module B straddle some blocks implementing module A. In this situation, many of the signals connecting A to itself must be routed over functional blocks implementing module B and many signals connecting B to itself must be routed over functional blocks implementing A. As a result, there is a relatively high amount of routing capacitance that will be toggled during operation of the circuit.

Figure 14:
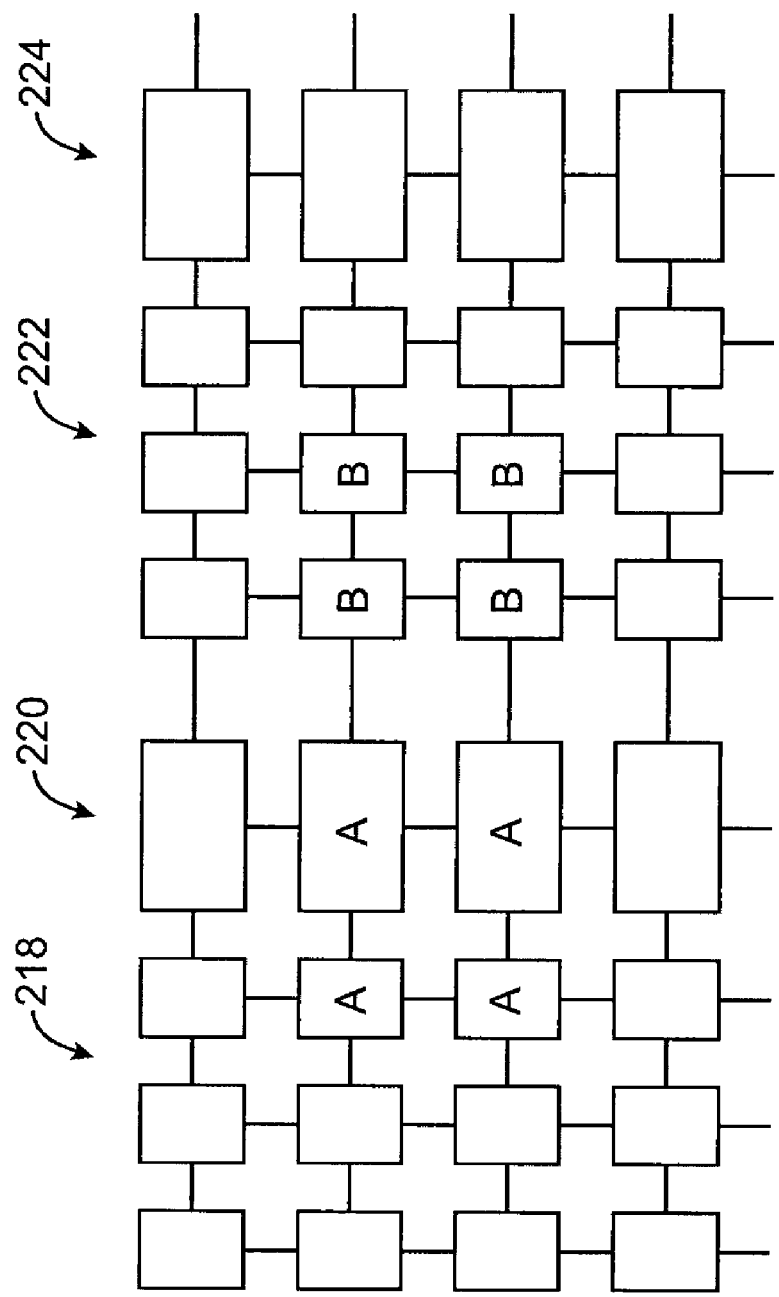

FIG. 14 shows an optimized placement of the same circuit. In this placement, module A does not straddle module B, and vice versa. The routing capacitance within each module has therefore been reduced, so that dynamic power consumption will be reduced.

The CAD tools 62 can preferably minimize clock routing dynamic power consumption. The underlying mechanisms involved in minimizing clock routing power consumption may also be used to optimize a placement so as to avoid straddling unused or unrelated logic.

As CAD tools 62 minimize dynamic power consumption due to clock routing, the hardware resources that the tools 62 should avoid straddling may be of the same type as the hardware resources used to implement the user's design (or part of the user's design). For example, the user's design may be implemented with LABs, and those LABs should not straddle unused (or unrelated) LABs, so as to minimize switching capacitance. The hardware resources the tools 62 should avoid straddling may also be of a different type than the hardware being used to implement the user's design (or part of the user's design). For example, the user's design may be implemented in LABs, and those LABs should not straddle LABs or other circuits such as multipliers or RAM blocks, so as to minimize switching capacitance. The hardware resources that the tools 62 should avoid straddling may be present on the device as a column (as with the multipliers in FIG. 12), as a row, as a large rectangle (such as found, for example, in a very large block of random-access memory), or in any other suitable shape.

The hardware resources the tools 62 should avoid straddling may include general logic blocks such as LABs, LUTs, and registers, multiplier blocks or more general digital signal processing blocks, random-access-memory blocks, clock management circuitry such as phase-locked loops (PLLs) or digital clock managers (DCMs), first-in-first-out buffers (FIFOs), input-output circuits (I/O pins), and barrel shifters.

The CAD tools 62 preferably make placement decisions that reduce dynamic power consumption due to clock signals. Clock signals are distributed on a set of clock lines which may be referred to as a clock tree. An illustrative clock tree for a programmable logic device containing an array of logic array blocks 226 is shown in FIG. 10. The clock tree of FIG. 15 includes clock spine paths 228, 232, 234, and 248. Spines 228 and 232 are coupled at point 230. Spines 234 and 238 are coupled at point 236. Clock path 240 is used to couple spines 228 and 232 with spines 234 and 238. Row clock lines 242 and row clock lines 244 are connected at various points to each spine.

CAD tools 62 can minimize clock power by minimizing the amount of clock tree structure (capacitance) that is toggled. Clock tree capacitive loading is reduced by using CAD tools 62 to determine optimal placements for the user logic in blocks 226. In particular, CAD tools 62 can use a cost function to compare the effectiveness of different possible logic circuit placements. The value of the cost function guides the CAD tools 62 in finding a low-loading implementation of the user's logic design. In general, clock power minimization by tools 62 involves minimizing the number of spines that are used and minimizing the number of row clock lines that are used. These operations reduce demand for global routing resources.

Global routing networks (i.e., the clock tree shown in the example of FIG. 15) are used to carry clock signals that have relatively high toggle rates. Global routing networks also span an entire device 10 or a large fraction of a device 10 and therefore have high capacitance. Globally routed clock signals therefore tend to consume a large amount of dynamic power.

Figure 15:
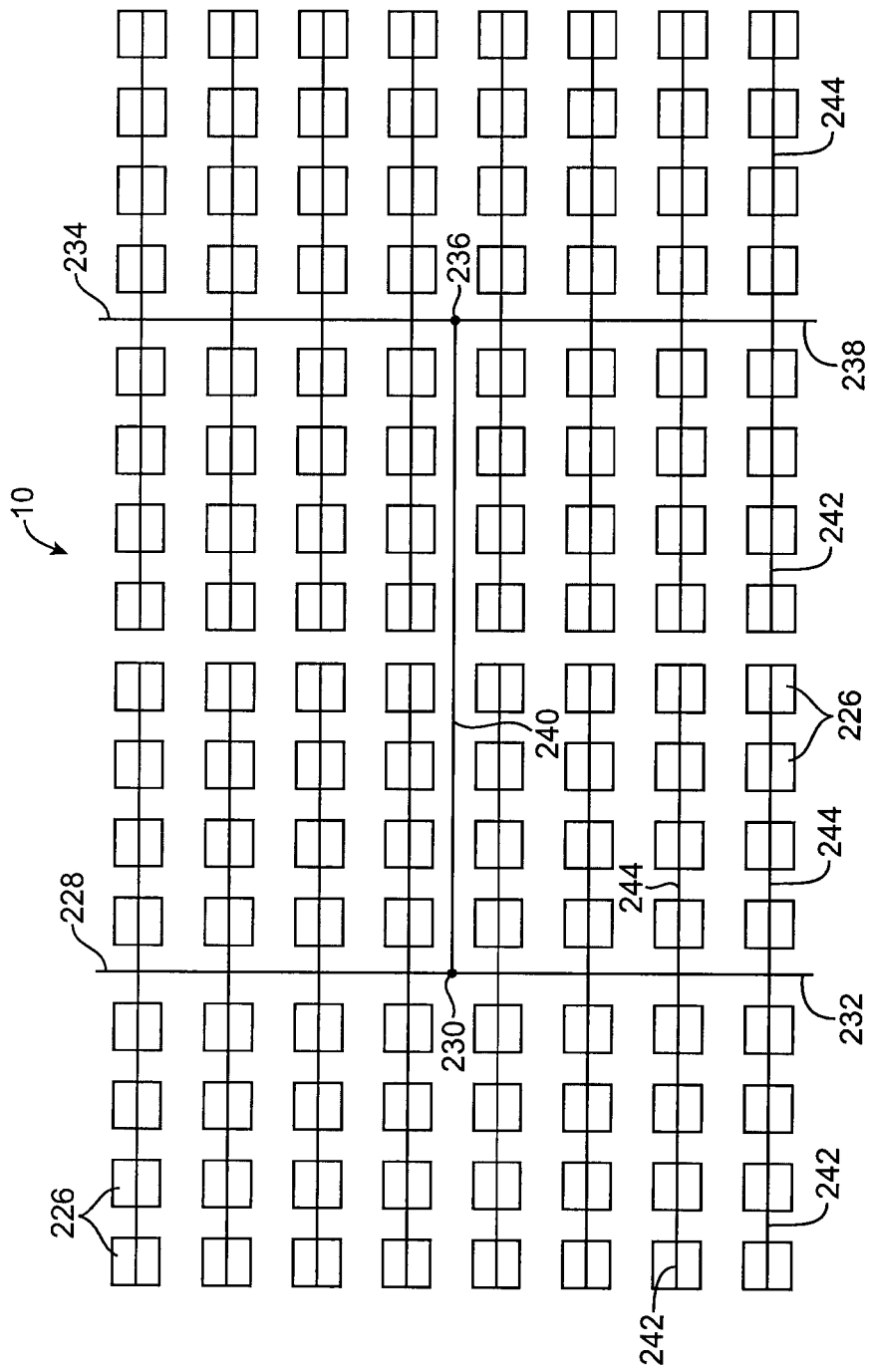
FIGS. 15-23 are circuit diagrams showing how computer-aided design tools in accordance with the present invention can be used to minimize dynamic power consumption in a clock tree on a programmable logic device integrated circuit.
Figure 16:
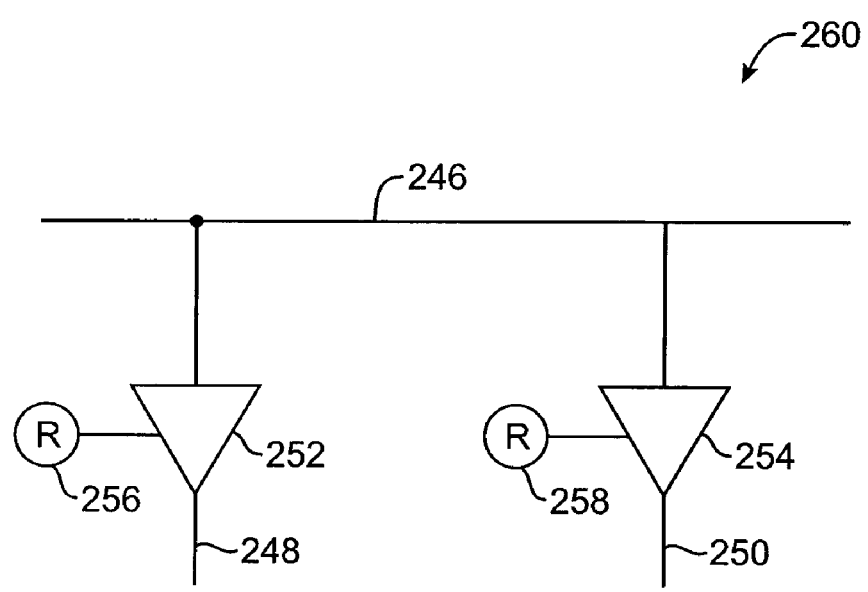

Many programmable logic devices have prefabricated global routing networks. The networks are often implemented as a segmented hierarchy of conductive lines and buffers. In the example of FIG. 15, the device 10 is a programmable logic device 10 that has a clock tree that is segmented into at least three levels. At each segmentation level the device has shutdown logic so that unused parts of the global routing tree can be made to not toggle. An illustrative portion of a clock tree 260 is shown in FIG. 16. In the example of FIG. 16, clock signals are being selectively distributed from clock tree path 246 (e.g., a row clock line associated with a row of logic blocks) to clock tree path branches 248 and 250 (e.g., rib clock lines). Configuration bit 256 controls the state of buffer 252. If bit 256 has one value, buffer 252 passes clock signals from path 246 to path 248. If bit 256 has another value, buffer 252 does not pass signals to path 248 and path 248 is shut down. Similarly, the state of configuration data bit 258 controls the operation of buffer 254.

Figure 17:
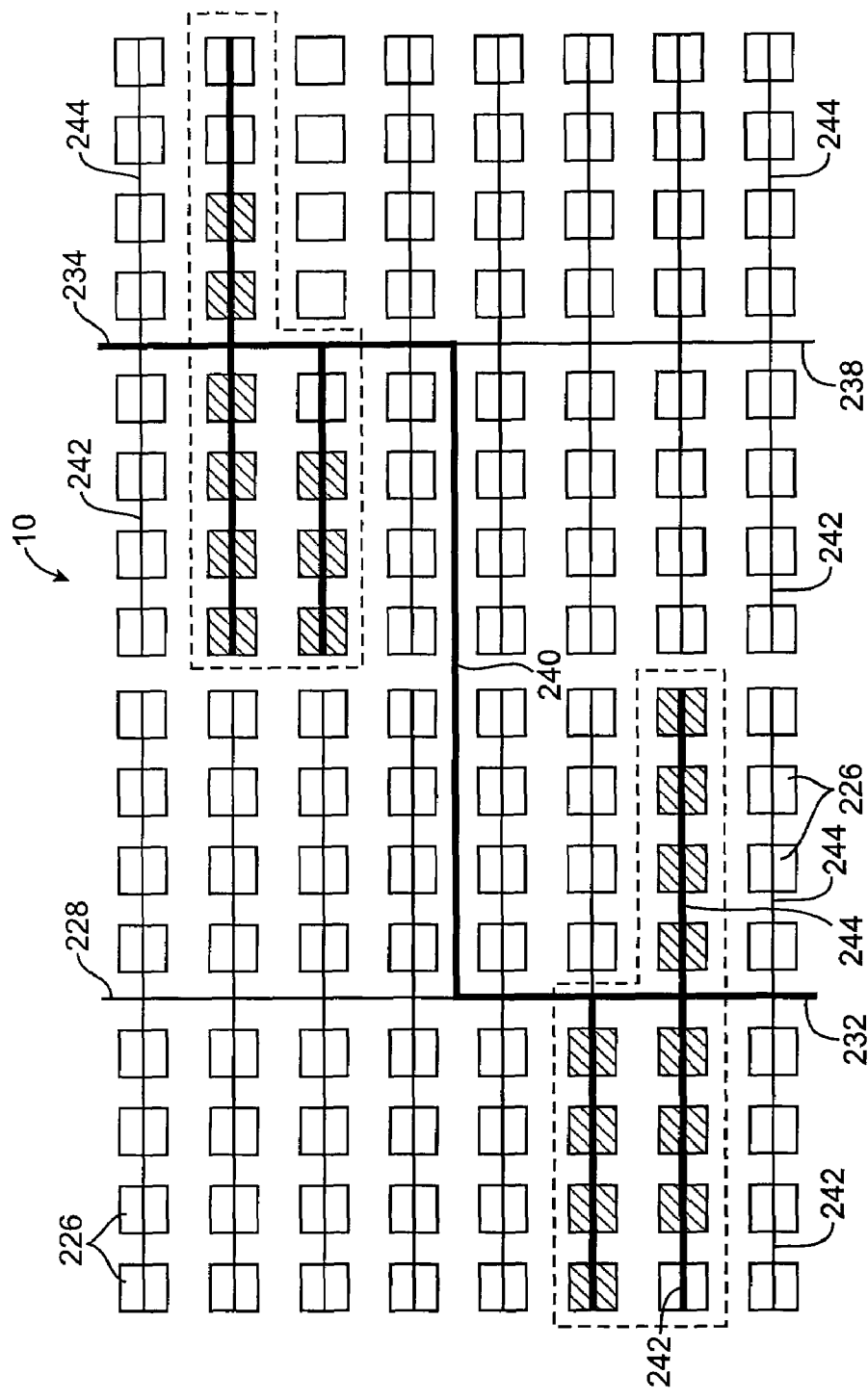

In the diagram of FIG. 17, the global routing network (clock tree) of FIG. 15 carries a particular clock and that clock signal is required by the logic array blocks that are marked with diagonal hashes. Only the portions of the global network marked with thick line segments toggle when the clock is active. The portions of the clock tree that are shown as having thin line segments are shut down (using configurable buffers of the type described in connection with FIG. 16) and therefore do not toggle.

Figure 18:
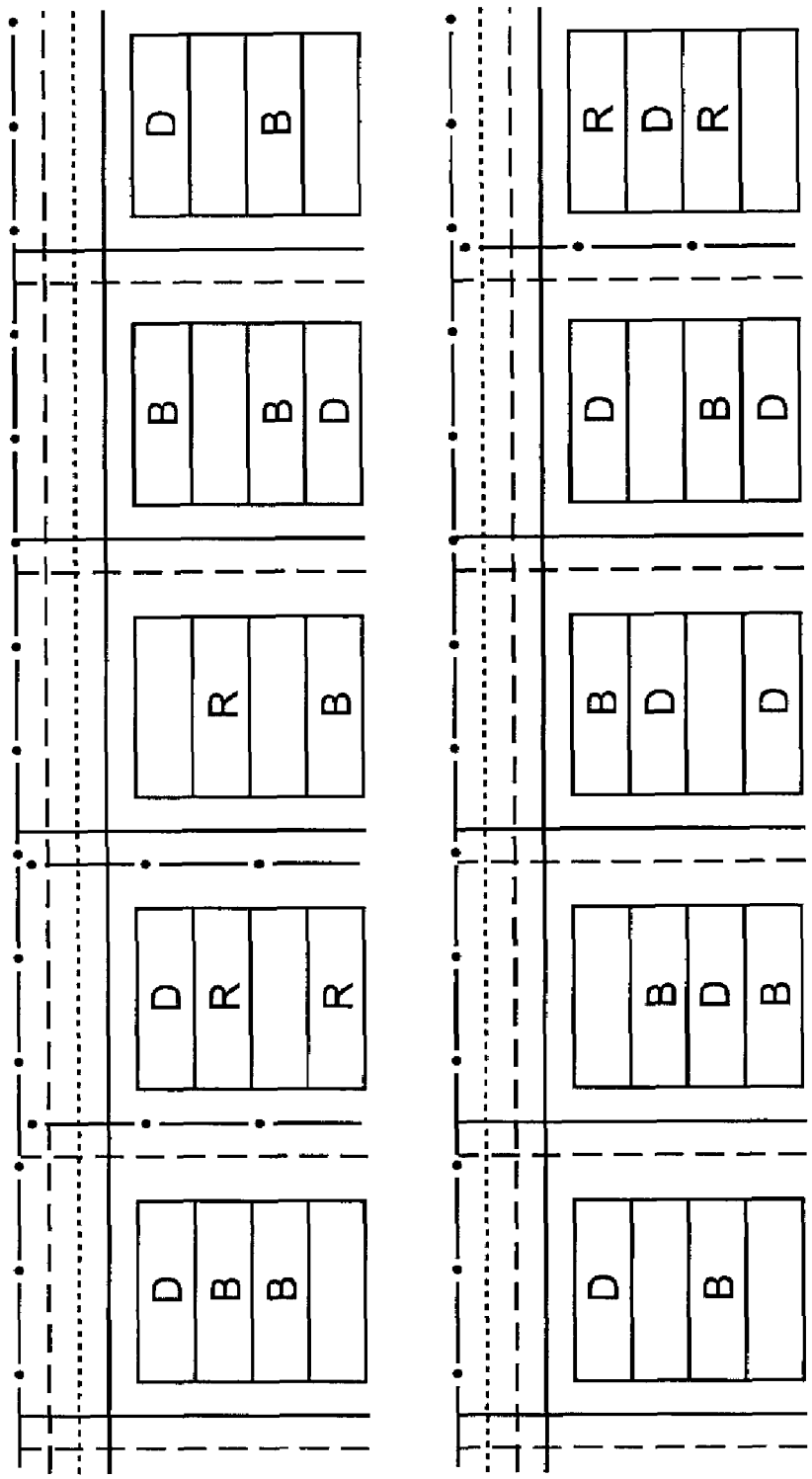

Consider, as an example, a design that uses three user clocks: B, R, and D. An unoptimized placement scheme for distributing these clocks to a set of logic array blocks on a programmable logic device is shown in FIG. 18. In FIG. 18, clock signal B is distributed to logic array blocks B on solid clock lines, clock signal R is distributed to logic array blocks R on dash-dot-dash lines, and clock signal D is distributed to logic array blocks D on dashed lines. The dotted lines represent unused clock lines.

In FIG. 18, each logic array block is labeled according to the clock signal it requires. For example, the blocks labeled B require the B clock signal that is distributed on the solid clock lines. Horizontal clock lines represent clock row lines and the vertical clock lines that fan out from the clock row lines represent clock rib lines that serve a set of four associated logic array blocks (in this example).

In the example of FIG. 18, five logic blocks require clock signal R, 11 blocks require clock signal B, and 11 blocks require clock signal D. For the particular placement depicted in FIG. 18, clock signal R requires two row clock lines and three rib clock lines, clock B requires 2 row clock lines and 8 rib clock lines, and clock D requires 2 row clock lines and 9 rib clock lines.

Figure 19:
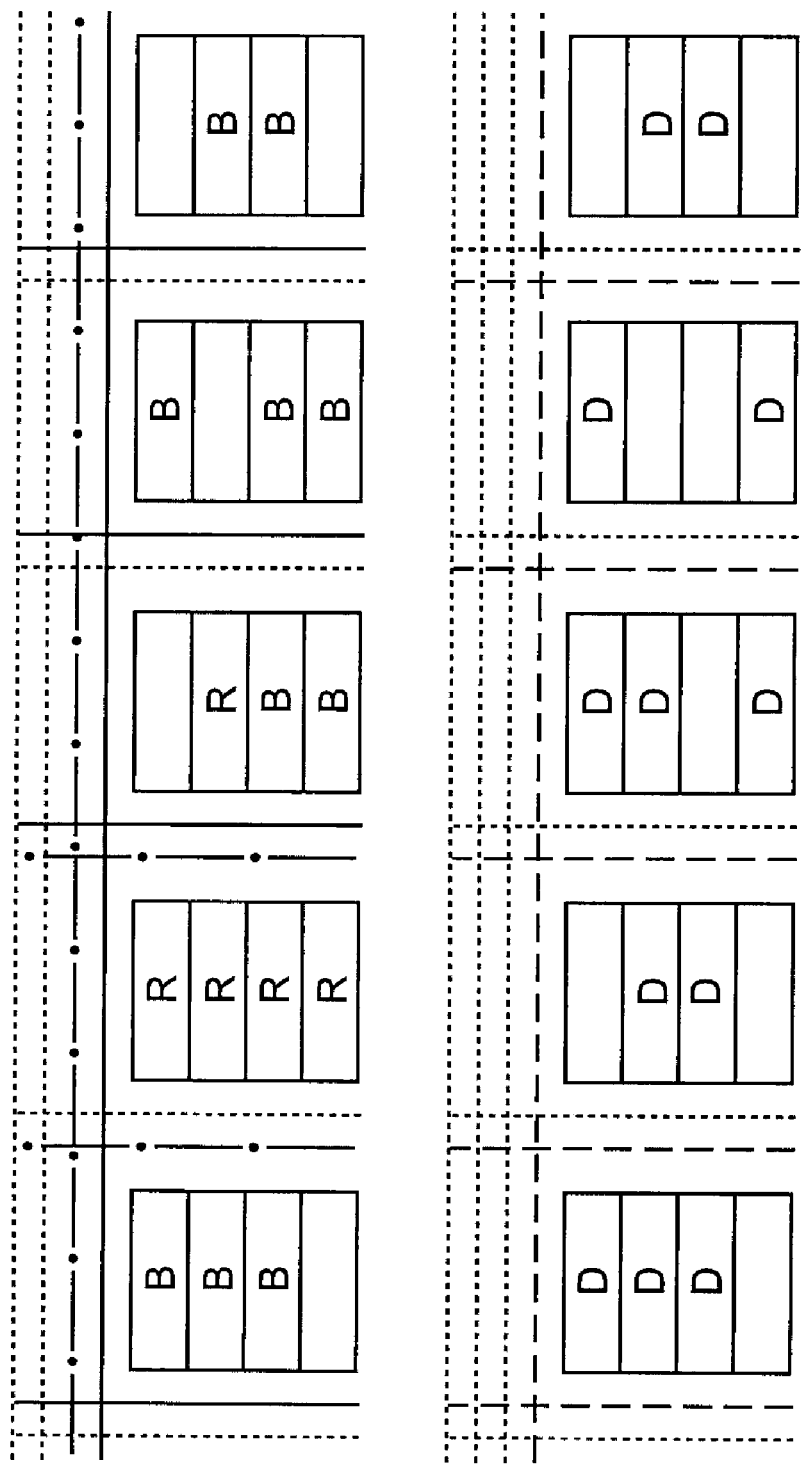

An optimized placement scheme of the type that CAD tools 62 produces is shown in FIG. 19. In the placement scheme of FIG. 19, clock power has been reduced. As shown in FIG. 19, clock signal R requires one row clock line and two rib clock lines, clock B requires one row clock line and four rib clock lines, and clock D requires one row clock lines and five rib clock lines. The placement in FIG. 19 therefore requires fewer clock routing resources and therefore will consume less power than the placement of FIG. 18, provided that tools 62 generate configuration data that configures adjustable clock distribution buffers such as the buffers of FIG. 16 so that the unused resources are prevented from toggling.

CAD tools 62 preferably use a cost function to determine which placements exhibit the lowest clock tree dynamic power consumption.

When determining a placement of functional blocks, CAD tools 62 may optimize over many dimensions, including wiring demand, timing delay, and area (real estate consumption). The CAD tools 62 can use a cost function F that will defines a real number indicating the overall quality of any particular placement. That is, if P is a placement in which functional blocks (e.g., logic array blocks, logic elements, or any other suitably-sized block of logic circuitry on a programmable logic device) are placed into placement regions on a device 10, then F(P) is a real number indicating the quality of the placement.

Without loss of generality, suppose that higher values for the cost function F indicate worse quality. The challenge in determining an optimum placement is to produce a routable valid placement P of the functional blocks in the design while minimizing the cost F(P).

The cost function F preferably includes terms for each of multiple objective metrics such as area, delay, and wiring demand. To make the cost function optimize for clock routing usage, a term is included that quantifies the clock routing demand of a given placement. Suppose F(P) is a pre-existing cost function for placement P. We define a modified cost function F'(P) as shown in equation 1.

$$F'(P) = \phi F(P) + (1-\phi) \text{ClockRoutingPowerCost}(P) \quad (1)$$

In equation 1, $\phi$ is a weighting factor between 0 and 1 that allows CAD tools 62 to trade off the pre-existing cost function against the power cost function.

The cost of the clock routing cost term should increase with increasing clock routing demand weighted by power consumption of that demand. In particular, ClockRoutingPowerCost(P) is greater than ClockRoutingPowerCost(Q), as shown in equation 2, if placement P causes more power to be consumed by clock routing than does placement Q.

$$\text{ClockRoutingPowerCost}(P) > \text{ClockRoutingPowerCost}(Q) \quad (2)$$

This monotonicity condition ensures that the cost function will force the placement algorithms used by tools 62 to optimize (i.e. reduce) clock power.

A user design may contain several different clock signals. The total clock routing power cost is equal to the sum of the clock routing power costs for each individual user clock signal. For clarity, cost function formulations are discussed with respect to a single user clock signal.

A given placement P for a user circuit will induce a minimal clock routing for each user clock signal C, denoted by ClockRouting(P,C). That is, a particular placement P will specify the locations of all functional blocks for the CAD tools 62. Each functional block specifies whether it requires user clock signal C. For a fixed device architecture with at least partially prefabricated global signal routing, there is a minimal way to route a user clock signal to all the functional blocks requiring that clock signal. The minimal clock routing can be identified with the set of clock routing wires used to route the clock, i.e. ClockRouting(P,C)={R1, ..., Rk} for some routing wires R1 through Rk.

The clock routing power cost function is the clock routing power consumed multiplied by a resource counting weighting, as shown in equation 3.

$$\text{ClockRoutingPowerCostForClock}(P,C) = \text{ClockRoutingPowerForClock}(P,C) * \text{ResourceCountingMetric}(\text{ClockRouting}(P,C)) \quad (3)$$

The clock routing power for a given placement P and user clock signal C is given by equation 4.

$$\text{ClockRoutingPowerForClock}(P,C) = \text{ToggleRate}(C) * \text{EnergyPerToggle}(\text{ClockRouting}(P,C)) \quad (4)$$

To first order, the energy per toggle of ClockRouting(P,C) is the sum of the energies per transition of the constituent routing resources. That is, if ClockRouting(P,C)={R1, ... Rk}, then the energy per toggle is given by equation 5.

$$\text{EnergyPerToggle}(\text{ClockRouting}(P,C)) = \Sigma_{i=1...k} \text{EnergyPerToggle}(Ri) \quad (5)$$

The energy per toggle for a given routing wire is an inherent device characteristic which may be estimated before a device is manufactured and which may be characterized using measurements after a device has been manufactured. This information is then provided to tools 62. The toggle rate of the clock is specified by the user's clock specification (i.e., user input).

The CAD tools 62 can also use a weighting factor, referred to herein as the ResourceCountingMetric weighting metric. This term allows the CAD tools 62 to reduce the overall clock routing usage in a step-wise manner.

Consider, as an example, use of a simplified metric based on resource counting. With this type of formulation, a weight of 1 is used for each clock routing resource that is used. For example, if ClockRouting(P,C)={R1, ..., Rk} then ResourceCountingMetric(ClockRouting(P,C))=k. For example, in FIG. 18, the simplified ResourceCountingMetrics for the three clocks are as follows.

For blocks R, the ResourceCountingMetricSimple(ClockRouting(P_FIG. 18, R)) is equal to 2+3, because the clock signal R uses two row clock lines and three rib clock lines.

For blocks B, the ResourceCountingMetricSimple(ClockRouting(P_FIG. 18, B)) is equal to 2+8, because clock signal B uses two row clock lines and eight rib clock lines.

For blocks D, the ResourceCountingMetricSimple(ClockRouting(P_FIG. 18, D)) is equal to 2+9, because clock signal D uses two row clock lines and nine rib clock lines.

As this example demonstrates, with the simplified version of the resource counting metric, the overall clock routing cost for a given user clock grows with the actual power consumed by the routing for that user clock. This correctly captures the objective of optimization.

The CAD tools preferably use a strictly concave (increasing magnitude with decreasing slope) formulation for the resource counting metric that takes additional factors such as clock fan-out region and occupancy into account.

Each clock routing resource R naturally defines a clock fan-out region, denoted ClockRegion(R), which is the set of all functional block locations reachable by traversing down the clock routing network rooted at R. In particular, consider a user clock signal C. If clock routing resource R is used in a minimal clock routing for C, then there must be some functional block B requiring clock C such that B is placed in the clock region of R. Otherwise there would be no reason to use R to route C.

Figure 20:
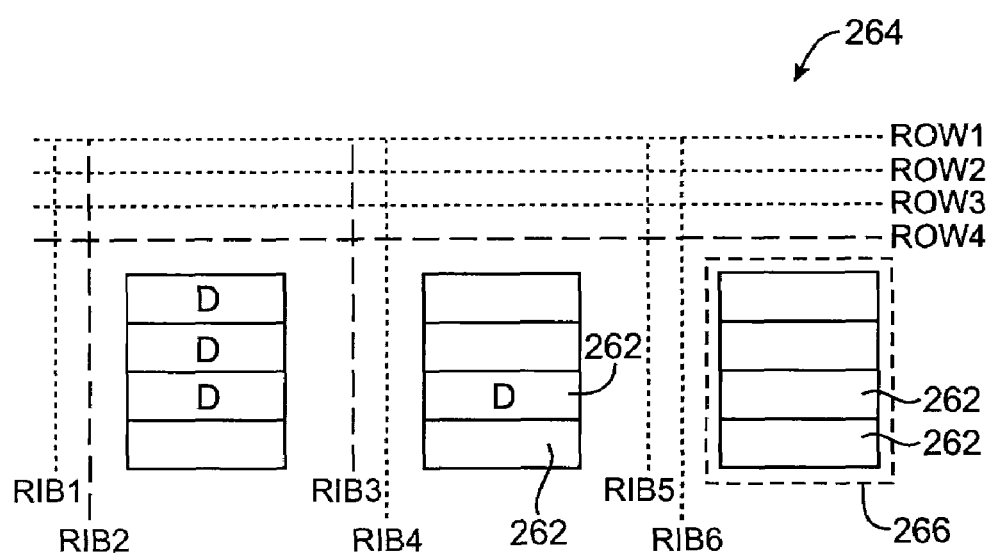

FIG. 20 illustrates the concept of clock regions. In FIG. 20, there are three sets of logic blocks 262 that are provided with clock signals over a clock tree 264. Horizontal lines in the clock tree 264 represent row clock lines. Vertical lines in the clock tree 264 represent rib clock lines. Each of the row clock lines eventually fans out to all of the blocks in the diagram. As a result, the clock region of each such row clock line corresponds to the entire set of block locations. Each of the rib clock lines fans out to the column of blocks to its right, so the clock region of each rib clock line is the column of block locations to its right.

The CAD tools 62 take occupancy into account using an Occupancy variable. If in placement P a user clock signal C is routed using clock routing resource R, then Occupancy(P, R, C) is defined as the number of functional blocks B placed in ClockRegion(R) such that block B requires clock C. The concept of occupancy captures the number of reasons why a particular routing resource needs to be used, not just the fact that it needs to be used. (Whether a resource is used or not can be represented as a binary decision, whereas the variable Occupancy allows relative comparison of already used resources.)

In the example of FIG. 20, clock routing paths that are unused are represented as dotted lines. Clock lines that are used to distribute clock signals to the "D" logic blocks are represented by dashed lines. The row and rib clock lines are labeled Row1, Row2, Row3, Row4, and Rib1, Rib2, Rib3, Rib4, Rib5, and Rib6. Dashed box 266 represents the ClockRegion(Rib5)=ClockRegion(Rib6). ClockRegion(Row1) is the set of all blocks shown in FIG. 20 and is the same as the clock fan-out regions for Row2, Row3, and Row4. In addition, ClockRegion(Rib1)=ClockRegion(Rib2) and ClockRegion(Rib3)=ClockRegion(Rib4). The occupancy values for various clock routing lines can be computed by tools 62 with respect to a given placement P of user blocks and user clock D. Occupancy(P,Row1,D) equals 4, Occupancy(P,Rib1,D) equals 3, Occupancy(P,Rib3,D) equals 1, and Occupancy(P, Rib5,D) equals 0.

CAD tools 62 preferably used a cost function that is increasing and strictly concave. A function H is strictly concave on a real interval [a, b] if and only if for all x and y in the interval [a, b], and for all t such that $0 \leq t \leq 1$, equation 6 is satisfied.

$$H(t^*x+(1-t)^*y) > t^*H(x)+(1-t)^*H(y) \quad (6)$$

In graphical terms, H is strictly concave over an interval from a to b if for any two points x and y within that interval ($a \leq x \leq y \leq b$) the chord (straight line) from H(x) to H(y) lies below the graph of H itself (i.e., the magnitude of H is increasing, while the slope of H is decreasing).

A sufficient but not necessary condition for function H to be strictly concave over an interval is for H to be twice differentiable over that interval with a negative second derivative. Examples of strictly concave functions include logarithm(x) over the interval (0,+infinity], SquareRoot(x) over the interval [0,+infinity], and cosine(x) over the interval $[-\pi/2, +\pi/2]$.

Note that cosine(x) is monotonically decreasing from for $0 \leq x \leq +\pi/2$ so it is unsuitable as a clock usage cost function in that interval. The function SquareRoot(x) is a suitable clock cost function for $x \geq 0$, and logarithm(x) is a suitable clock cost function for x>0.

The notion of strict concavity also extends to functions whose domain is restricted to a subset of a real interval of numbers. For example, one can similarly define strict concavity for functions which are defined only on the set of non-negative integers.

CAD tools 62 preferably use a resource counting metric that exhibits strict concavity. Let ClockRouting(P,C)= {R1, ..., Rk} be a minimum clock routing for user clock C with respect to P (and implicitly with respect to a fixed device with prefabricated clock routing).

Equation 7 can be used to define the cost function ResourceCountingMetricB.

$$ResourceCountingMetricB(ClockRouting(P, C)) = \quad (7)$$
$$ResourceCountingMetricB(\{R1, \ldots, Rk\}) =$$
$$\sum_{i=1..k} H(Occupancy(P, Ri, C))$$

In equation 7, H is a non-negative, increasing, and strictly concave function. With this formulation, each routing resource is viewed as a separable resource, so each routing resource is treated independently and its costs are added. The concave function H senses partial progress toward its goal, which guides the CAD tools 62 to an optimum low-dynamic-power solution.

The example that was introduced in connection with FIG. 20 can be used to illustrate how the cost function ResourceCountingMetricB encourages stepwise progress towards an optimum solution.

Figure 21:
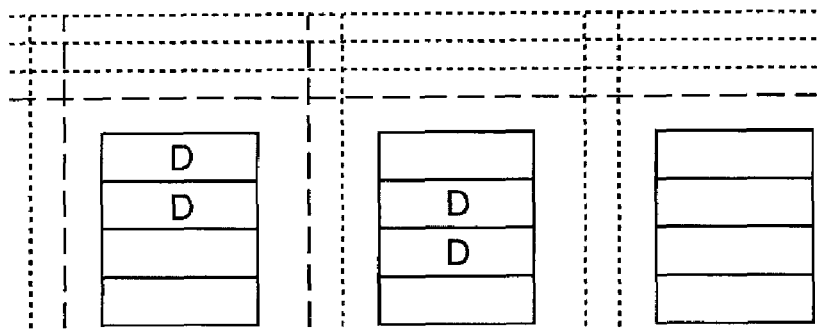
Figure 22:
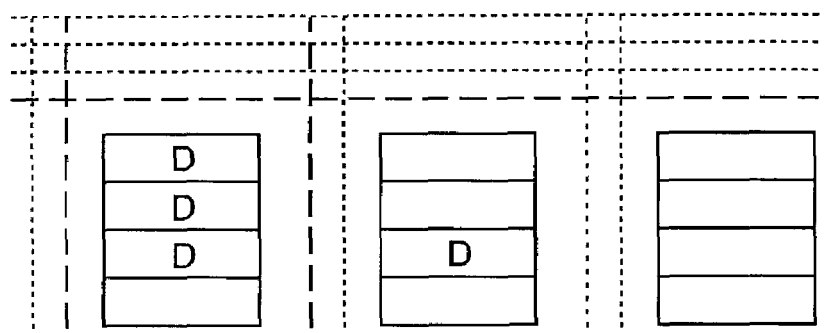
Figure 23:
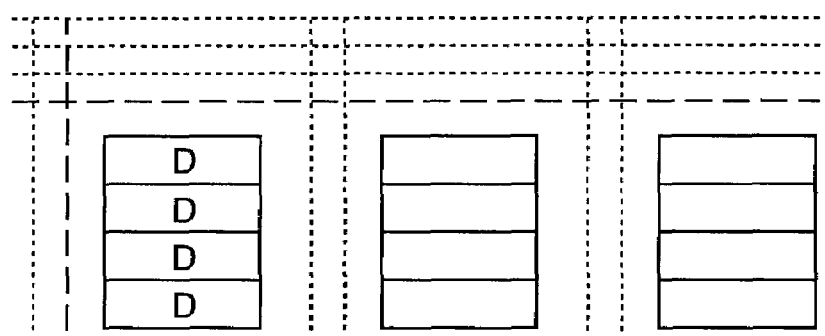

FIGS. 21, 22, and 23 show three placements called placements P1, P2, and P3, respectively. Placements P1 and P2 have suboptimal clock routing, but P3 is optimal.

Placements P1 and P2 both use the same number of row clock lines and rib clock lines, so the simplified linear routing cost metric ResourceCountingMetricSimple has the same value for both of them (i.e., 1+1+1=3). The function ResourceCountingMetricSimple therefore does not prefer P1 to P2 or vice versa (two rib clock lines being used in each). However, a visual inspection indicates that P2 should be closer to the optimal configuration P3 (in which one rib clock line is used) and should be assigned a lower cost. The value of ResourceCountingMetricSimple for placement P3 is 1+1=2.

Using a strictly concave cost function over occupancy counts allows the optimization algorithm to detect stepwise improvement. For example, when the SquareRoot function over occupancies is used as the counting metric, placement P1 results in a cost of Sqrt(4)+Sqrt(2)+Sqrt(2), because the occupancy of the used row clock line is 4, and each of the two used rib clock lines has an occupancy of 2. Similarly, placement P2 is assigned a resource counting metric of Sqrt(4)+Sqrt(3)+Sqrt(1), because the occupancies of the three used clock lines are 4, 3, and 1, respectively. Finally, placement P3 is assigned resource counting metric Sqrt(4)+Sqrt(4). Numerically, the values are given in equations 8, 9, and 10.

$$ResourceCountingMetricB(P1)=2+2*1.41=4.82 \quad (8)$$

$$ResourceCountingMetricB(P2)=2+1.73+1=4.73 \quad (9)$$

$$ResourceCountingMetricB(P3)=2+2=4 \quad (10)$$

Note that the numerical value of the strictly concave resource counting metric ResourceCountingMetricB captures the stepwise improvement from P1 to P2 and then finally to the optimal placement P3.

The CAD tools 62 can use the resource counting metric cost function to reduce clock routing power by favoring the use of smaller overall clock networks, e.g. quadrant or smaller regional clock networks over chip-wide global clock networks (e.g., a global clock versus a quadrant clock). Within a given overall clock network, CAD tools 62 may reduce the demand for clock spines, clock rows, clock ribs, and other segmentation levels. Within a single functional block, CAD tools 62 may reduce the number of clocks required, and thereby provide more degrees of freedom to the bit-setting optimizations described in connection with FIGS. 5, 6, and 7. For example, in certain programmable logic devices 10, a LAB may allow up to two clocks and each register in the LAB must select from one of two LAB-clock lines. If CAD tools 62 reduce the LAB-clock demand from two clocks to one clock, the unused registers in the LAB can select the unused LAB-clock line, as it will not toggle. This reduces the power consumed by the unused registers.

The technique of summing concave costs over occupancy counts that is used by CAD tools 62 can be used to optimize the use of shared resources such as routing resources for handling regular data signals. In this type of situation, there may be a choice between using long lines or short lines to route regular data signals. It is advantageous to use just one short line rather than two short lines or one long line. CAD tools 62 may split the placement region into bins, each defined to be the fan-out region of a short wire. Then CAD tools 62 may use ResourceCountingMetricB over a concave function of the occupancy bins to guide the CAD tools 62 toward emptying one of the bins. In this way CAD tools 62 work toward eliminating the routing demand in the emptied bin. Once the bin is emptied, it is no longer necessary to use the long wire or to use all of the short wires.

An input-output (I/O) bank is a group of I/O circuits that share power rails. It is advantageous to minimize the number of I/O banks used in a device so that the power rails on unused I/O banks need not be used. This eliminates the static power consumption contribution from all of the circuitry in the unused I/O banks. CAD tools 62 can minimize I/O circuitry power consumption using a cost function. The cost of the occupancy of each I/O bank is represented using a positive, increasing, strictly concave function. This arrangement is sufficient to guide the CAD tools 62 to an optimum solution in a step-wise fashion.

As described in connection with FIGS. 10-14, CAD tools 62 can optimize dynamic power consumption by avoiding placements that involve straddling unused or unrelated logic. Suppose a highly interconnected module contains only LABs. Placement bins can be defined which represent contiguous regions on the device containing only LABs. CAD tools 62 may use ResourceCountingMetricB to impose a positive, increasing, strictly concave cost over the occupancy of the bins. This will guide the CAD tools 62 in a stepwise fashion so that as few bins as possible are used. As a result, tools 62 will minimize the number of times the placement of the module's blocks will straddle unused resources such as multipliers or RAM blocks.

CAD tools 62 can minimize the number of logic blocks that are used in a given implementation of a user's design. For example, some computer-aided design algorithms insert logic elements into a design to address routability concerns. A logic element may, as an example, be duplicated in order to improve the likelihood that a design may be efficiently routed. Similarly, a trivial LUT implementing the identity function may be inserted to provide extra routing flexibility. Both such optimizations may require that more power be consumed. In particular, they increase the utilization of the device and therefore reduce the ability of the CAD tools 62 to successfully reduce dynamic power consumption.

There is therefore a tradeoff between the goals of a performance optimization (e.g. increasing routability or improving timing) and the goals of power reduction. Tools 62 preferably are able to balance these competing goals. With one suitable approach, tools 62 may use a cost function to evaluate both optimizations individually and assign weighting terms to both. For example, a particular placement and routing of a design may be denoted by D, the routability and timing costs of D may be denoted by RT(D), and the associated power consumption cost may be denoted by P(D). CAD tools 62 may trade off one optimization against the other by attempting to minimize the weighted sum TotalCost(D)=$\phi$*RT(D)+ (1−$\phi$)*P(D), where the weighting constant $\phi$ is selected (e.g., by user input) to reflect overall goals for the CAD tools 62, e.g. to balance user demands for routability and timing against power reduction.

In general, power reduction is always advantageous in programmable logic devices, especially as semiconductor fabrication technology advances and devices are able to run a higher clock frequencies. Using the techniques of the present invention, CAD tools 62 can reduce dynamic and static power consumption by selecting appropriate bit settings for unused resources on a device. A user design normally only uses a part of the available resources on a programmable logic device, so the use of CAD tools 62 to reduce dynamic power consumption by reducing power consumption in unused logic has wide applicability.

The foregoing is merely illustrative of the principles of this invention and various modifications can be made by those skilled in the art without departing from the scope and spirit of the invention.

What is claimed is:

1. A method for using computer-aided design tools to create configuration data that specifies how a given user logic design is implemented in a programmable logic device from logic blocks and routing resources, wherein some logic blocks in the programmable logic device are used when implementing the logic design and some logic blocks in the programmable logic device are unused when implementing the logic design, the method comprising:

using the computer-aided design tools to provide a user with an opportunity to enter the given user logic design; and with the computer-aided design tools, identifying which configuration data will minimize dynamic power consumption in the programmable logic device by minimizing power dissipated due to signal toggling in the unused logic blocks and the routing resources.

2. The method defined in claim 1, wherein at least some of the used logic blocks have unused output lines with associated output line capacitances, wherein the unused output line for a first of the used logic blocks has a first capacitance that is larger than a second capacitance that is associated with the unused output line for a second of the used logic blocks, the method further comprising:

with the computer-aided design tools, identifying which configuration data will implement the given logic design using the second logic block rather than using the first logic block to reduce dynamic power consumption in the programmable logic device due to signal toggling on the unused output lines.

3. The method defined in claim 1, wherein at least some of the used logic blocks have output lines with associated output line capacitances, wherein the output line for a first of the used logic blocks has a first capacitance that is larger than a second capacitance that is associated with the output line for a second of the used logic blocks, the method further comprising:

with the computer-aided design tools, identifying which configuration data will implement the given logic design using the second logic block rather than using the first logic block to reduce dynamic power consumption in the programmable logic device due to signal toggling on the output lines.

4. The method defined in claim 1 further comprising:

with the computer-aided design tools, identifying which configuration data will place the given logic design in logic block locations that minimize straddling of unused and unrelated resources.

5. The method defined in claim 1, further comprising:

with the computer-aided design tools, identifying which configuration data will implement the given logic design with a minimized dynamic power consumption by comparing a first implementation in which signals from a first of the logic blocks straddle a given one of the unused logic blocks when being provided to a second of the logic blocks and a second implementation in which signals from the first logic block do not straddle the given logic block when being provided to the second logic block.

6. The method defined in claim 1, further comprising:

with the computer-aided design tools, identifying which configuration data will implement the given logic design with a minimized dynamic power consumption by identifying default logic circuit settings for a plurality of unused logic circuits that reduce signal toggling in unused circuitry on the programmable logic device.

7. The method defined in claim 1, further comprising:

with the computer-aided design tools, identifying which configuration data will implement the given logic design with a minimized dynamic power consumption by identifying default logic block settings for a plurality of the unused logic blocks that reduce signal toggling in portions of the unused logic blocks based on logic block type.

8. The method defined in claim 1, further comprising:

with the computer-aided design tools, identifying which configuration data will implement the given logic design with a minimized dynamic power consumption by identifying default configuration data settings for a plurality of unused logic circuits in the unused logic blocks that reduce signal toggling on output lines associated with the unused logic circuits based on what type of logic circuitry is connected to input lines associated with the unused logic circuits.

9. The method defined in claim 1, further comprising:

with the computer-aided design tools, identifying which configuration data will implement the given logic design with a minimized dynamic power consumption by identifying default configuration data settings for a plurality of unused logic circuits in the unused logic blocks that reduce signal toggling on output lines associated with the unused logic circuits based on which logic function is performed by the logic circuitry that is connected to input lines associated with the unused logic circuits.

10. The method defined in claim 1, further comprising:

with the computer-aided design tools, identifying which configuration data will implement the given logic design with a minimized dynamic power consumption by identifying default logic circuit settings for a plurality of multiplexers that reduce signal toggling in unused circuitry on the programmable logic device that is connected downstream from the plurality of multiplexers.

11. The method defined in claim 1, further comprising:

with the computer-aided design tools, identifying which configuration data will implement the given logic design with a minimized dynamic power consumption by identifying logic block settings for a plurality of the unused logic blocks that reduce signal toggling in portions of the unused logic blocks based on signal toggling rates.

12. The method defined in claim 1, further comprising:

with the computer-aided design tools, identifying which configuration data will implement the given logic design with a minimized dynamic power consumption by identifying logic block settings for a plurality of the unused logic blocks that reduce signal toggling in portions of the unused logic blocks based on signal static probabilities.

13. The method defined in claim 1, further comprising:

with the computer-aided design tools, identifying which configuration data will implement the given logic design with a minimized dynamic power consumption by identifying logic block settings for a plurality of the unused logic blocks that reduce signal toggling in portions of the unused logic blocks based on signal static probabilities and based on signal toggling rates.

14. The method defined in claim 1, further comprising:

with the computer-aided design tools, identifying which configuration data will implement the given logic design with a minimized dynamic power consumption by identifying logic block settings for a plurality of the unused logic blocks that reduce signal toggling in portions of the unused logic blocks based on signal toggling rates and logic functions in circuits upstream from the unused logic blocks.

15. The method defined in claim 1, further comprising:

with the computer-aided design tools, identifying which configuration data will implement the given logic design with a minimized dynamic power consumption by identifying logic block settings for a plurality of the used logic blocks that reduce signal toggling in carry outputs of the used logic blocks that are connected to unused logic.

16. A computer-readable storage media, embedded thereon software, which when executed by a computer, causes the computer to create configuration data that specifies how a given user logic design is implemented in a programmable logic device from logic blocks and routing resources, wherein some logic blocks in the programmable logic device are used when implementing the logic design and some logic blocks in the programmable logic device are unused when implementing the logic design, the software comprising:

computer-aided design tool code for providing a user with an opportunity to enter the given user logic design; and computer-aided design tool code for identifying which configuration data will minimize dynamic power consumption in the programmable logic device by minimizing power dissipation due to signal toggling in the unused logic blocks and signal toggling in the routing resources.

17. A method for using computer-aided design tools to create configuration data that specifies how a given user logic design is implemented in a programmable logic device, wherein some logic blocks in the programmable logic device are used when implementing the logic design and some logic blocks in the programmable logic device are unused when implementing the logic design and wherein the used logic blocks are placed in a number of placement regions by the computer-aided design tools when implementing the logic design, the method comprising:

using the computer-aided design tools to provide a user with an opportunity to enter the given user logic design; and with the computer-aided design tools, identifying which configuration data will minimize power consumption by using a strictly concave cost function to determine how to minimize the number of placement regions required to implement the design.

18. The method defined in claim 17 wherein identifying which configuration data will minimize power consumption comprises using an occupancy variable in the cost function, wherein the occupancy variable specifies the number of reasons why a particular placement region needs to be used to implement the design.

19. The method defined in claim 17 wherein the programmable logic device contains a clock tree, wherein the clock tree is used to distribute a signal to the used logic blocks, and wherein identifying which configuration data will minimize power consumption comprises using a strictly concave cost function to determine how to place the logic blocks using the signal so that use of clock routing resources is minimized.

20. The method defined in claim 17 wherein the programmable logic device contains a clock tree, wherein the clock tree comprises first clock lines and second clock lines, wherein the second clock lines fan out from the first clock lines, and wherein identifying which configuration data will minimize power consumption comprises using the cost function to compute for each of multiple clock fan-out regions each of which contains a set of the logic blocks, how many of the logic blocks in that clock fan-out region require use of one of the second clock lines.

21. The method defined in claim 17 wherein the programmable logic device contains a clock tree, wherein the clock tree comprises row clock lines and rib clock lines and wherein identifying which configuration data will minimize power consumption comprises using the cost function to compute costs associated with using the row clock lines and costs associated with using the rib clock lines.

22. The method defined in claim 17 wherein identifying which configuration data will minimize power consumption comprises using a square root cost function to determine where to place the used logic blocks.

23. A computer-readable storage media, embedded thereon software, which when executed by a computer, causes the computer to create configuration data that specifies how a given user logic design is implemented in a programmable logic device, wherein some logic blocks in the programmable logic device are used when implementing the logic design and some logic blocks in the programmable logic device are unused when implementing the logic design and wherein the used logic blocks are placed in a number of placement regions by the computer-aided design tools when implementing the logic design, the software comprising:

computer-aided design tool code for providing a user with an opportunity to enter the given user logic design; and computer-aided design tool code for identifying which configuration data will minimize power consumption by using a strictly concave cost function to determine how to minimize the number of placement regions required to implement the design.

* * * * *